(12) United States Patent
Mikhailov et al.

(10) Patent No.: US 8,221,229 B2
(45) Date of Patent: Jul. 17, 2012

(54) SPHERICAL ENDED CONTROLLER WITH CONFIGURABLE MODES

(75) Inventors: Anton Mikhailov, Campbell, CA (US); Richard Marks, Pleasanton, CA (US); Gary M. Zalewski, Oakland, CA (US); Ennin Huang, Santa Clara, CA (US); Eric Larsen, Pacifica, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 254 days.

(21) Appl. No.: 12/604,352

(22) Filed: Oct. 22, 2009

(65) Prior Publication Data

US 2010/0105480 A1    Apr. 29, 2010

Related U.S. Application Data

(63) Continuation-in-part of application No. 12/259,181, filed on Oct. 27, 2008, and a continuation-in-part of application No. 12/428,433, filed on Apr. 22, 2009.

(60) Provisional application No. 61/200,973, filed on Dec. 5, 2008, provisional application No. 61/120,340, filed on Dec. 5, 2008.

(51) Int. Cl.
*G06F 17/00* (2006.01)

(52) U.S. Cl. .......................................... 463/25

(58) Field of Classification Search .............. 463/30–38; 345/156, 157, 161
See application file for complete search history.

(56) References Cited

U.S. PATENT DOCUMENTS

| | | | |
|---|---|---|---|
| 4,787,051 A | 11/1988 | Olson | 364/518 |
| 4,843,568 A | 6/1989 | Krueger et al. | 364/518 |
| 5,128,671 A | 7/1992 | Thomas, Jr. | 341/20 |
| 5,317,140 A | 5/1994 | Dunthorn | 250/221 |
| 5,440,326 A | 8/1995 | Quinn | 345/156 |
| 5,528,265 A | 6/1996 | Harrison | 345/158 |
| 5,889,505 A | 3/1999 | Toyama et al. | 345/156 |
| 6,130,664 A | 10/2000 | Suzuki | |
| 6,157,368 A | 12/2000 | Faeger | 345/156 |
| 6,243,491 B1 | 6/2001 | Andersson | 382/165 |
| 6,375,572 B1 | 4/2002 | Masuyama et al. | 463/43 |
| 7,263,462 B2 | 8/2007 | Funge et al. | 702/179 |
| 7,296,007 B1 | 11/2007 | Funge et al. | 706/47 |

(Continued)

OTHER PUBLICATIONS

Bolt, R.A., "Put-that-there": voice and gesture at the graphics interface,Computer Graphics, vol. 14, No. 3 (ACM SIGGRAPH Conference Proceedings) Jul. 1980, pp. 262-270.

(Continued)

*Primary Examiner* — Ronald Laneau
(74) *Attorney, Agent, or Firm* — Martine Penilla Group, LLP

(57) ABSTRACT

Input devices for interfacing with a game console to interact with a computer program are disclosed. In one example, the input device includes a controller with a handle and a spherical object that is connected to a first end of the handle. The controller further includes a circuit that identifies the position of the handle. The circuit further includes communication logic to communicate the identified position to the game console during interaction with the computer program. The controller further includes control inputs connected to a second end of the handle, wherein the spherical object is placed in contact with a surface when held by the handle and the circuit updates the identified position of the handle as the handle is pivoted on the surface. The control inputs providing commands that are exchanged with the game console to further interact with the computer program.

12 Claims, 21 Drawing Sheets

U.S. PATENT DOCUMENTS

| | | | |
|---|---|---|---|
| 7,558,698 B2 | 7/2009 | Funge et al. | 702/179 |
| 7,609,249 B2 * | 10/2009 | Fouquet et al. | 345/156 |
| 7,636,645 B1 | 12/2009 | Yen et al. | 702/152 |
| 7,636,697 B1 | 12/2009 | Dobson et al. | 706/12 |
| 7,636,701 B2 | 12/2009 | Funge et al. | 706/47 |
| 7,646,372 B2 * | 1/2010 | Marks et al. | 345/156 |
| 7,850,526 B2 * | 12/2010 | Zalewski et al. | 463/36 |
| 2002/0085097 A1 | 7/2002 | Colmenarez et al. | 348/211 |
| 2004/0212589 A1 | 10/2004 | Hall et al. | 345/156 |
| 2006/0277571 A1 | 12/2006 | Marks et al. | 725/37 |
| 2007/0117625 A1 | 5/2007 | Marks et al. | 463/30 |
| 2008/0261693 A1 | 10/2008 | Zalewski | 463/31 |
| 2009/0213070 A1 * | 8/2009 | Kalaldeh et al. | 345/157 |
| 2009/0221368 A1 | 9/2009 | Yen et al. | 463/32 |
| 2009/0221374 A1 | 9/2009 | Yen et al. | 463/42 |
| 2009/0288064 A1 | 11/2009 | Yen et al. | 717/106 |
| 2009/0315740 A1 * | 12/2009 | Hildreth et al. | 341/20 |
| 2010/0004896 A1 | 1/2010 | Yen et al. | 702/153 |

OTHER PUBLICATIONS

DeWitt, Thomas and Edelstein, Phil "Pantomation: A System for Position Tracking", Proceedings of the $2^{nd}$ Symposium on Small Computers in the Arts, Oct. 1982, pp. 61-69.

* cited by examiner

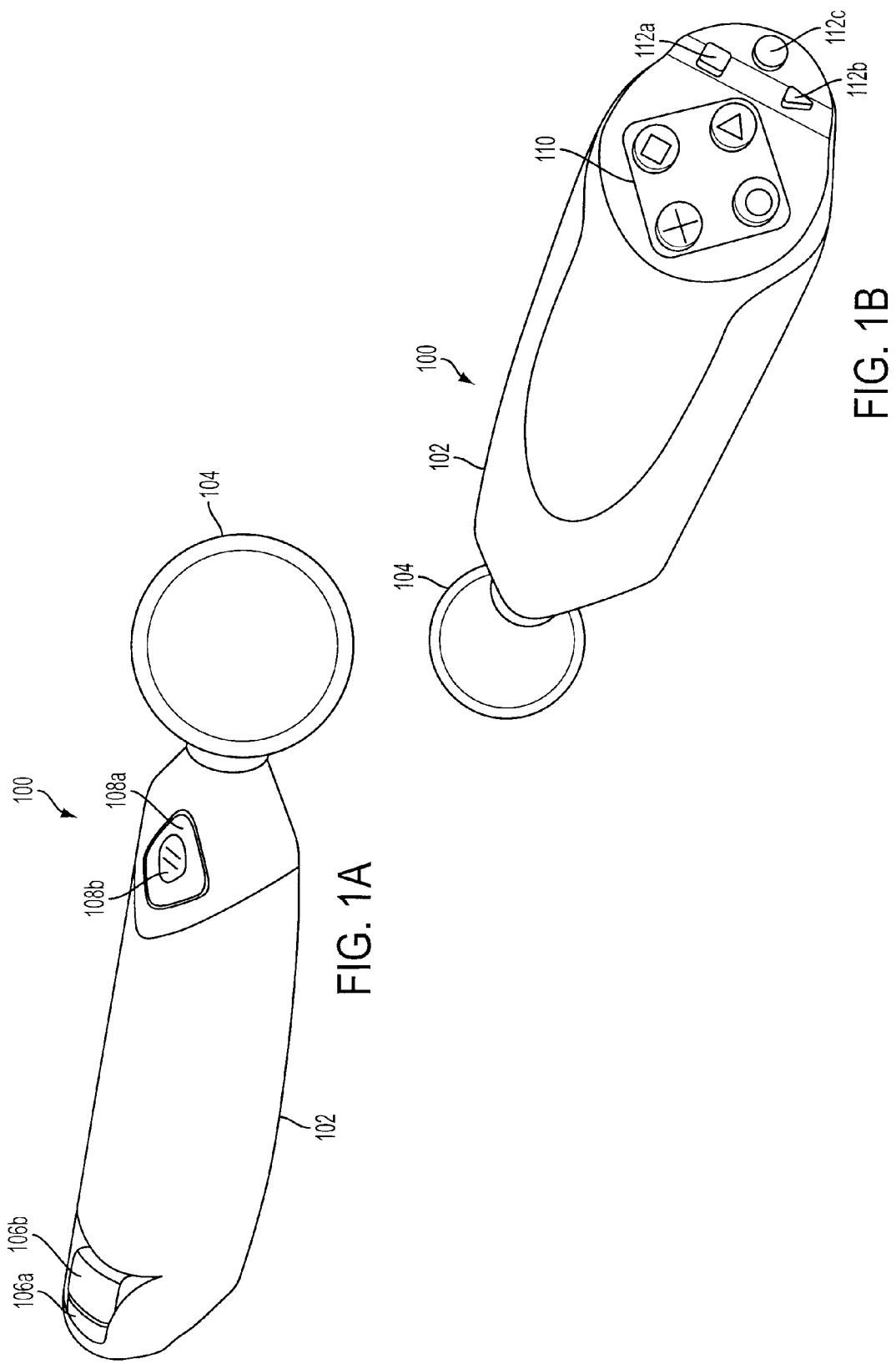

SPHERICAL ENDED CONTROLLER WITH CONFIGURABLE MODES

CLAIM OF PRIORITY

This application claims priority under 35 USC §119 from U.S. Provisional Patent Application No. 61/200,973, filed Dec. 5, 2008, and entitled, "SPHERICAL ENDED CONTROLLER WITH CONFIGURABLE MODES", and U.S. Provisional Patent Application No. 61/120,340, filed on Dec. 5, 2008, and entitled "CONTROL DEVICE FOR COMMUNICATING VISUAL INFORMATION". This application also claims priority under 35 USC §120, as a continuation in part from U.S. patent application Ser. No. 12/259,181, filed Oct. 27, 2008, and entitled, "DETERMINING LOCATION AND MOVEMENT OF BALL-ATTACHED CONTROLLER". This application also claims priority under 35 USC §120, as a continuation in part from U.S. patent application Ser. No. 12/428,433, filed on Apr. 22, 2009, and entitled, "EXPANDABLE CONTROL DEVICE VIA HARDWARE ATTACHMENT". These applications are herein incorporated by reference.

CROSS REFERENCE TO RELATED APPLICATIONS

This application is related to U.S. patent application Ser. No. 11/588,779, filed Oct. 26, 2006 and entitled, "SYSTEM AND METHOD FOR INTERFACING WITH A COMPUTER PROGRAM"; U.S. patent application Ser. No. 12/145,455, filed Jun. 24, 2008 and entitled, "DETERMINATION OF CONTROLLER THREE-DIMENSIONAL LOCATION USING IMAGE ANALYSIS AND ULTRASONIC COMMUNICATION", all of which are incorporated herein by reference.

BACKGROUND

Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2®(PS2), and Sony Playstation3® (PS3), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture captured by a video camera that tracks an object.

It is within this context that embodiments of the invention arise.

SUMMARY OF THE INVENTION

Broadly speaking, the present invention describes a controller for a game console that can be used in a variety of configurations to improve interaction with a video game. In one embodiment, the controller can be held like a pointer, a wand or placed in contact with a surface and used like a joystick.

It should be appreciated that the present invention can be implemented in numerous ways, such as a process, an apparatus, a system, a device or a method on a computer readable medium. Several inventive embodiments of the present invention are described below.

In one embodiment, an input device for interfacing with a game console to interact with a computer program is disclosed. The input device includes a controller with a handle and a spherical object that is connected to a first end of the handle. The controller further includes a circuit that identifies the position of the handle. The circuit further includes communication logic to communicate the identified position to the game console during interaction with the computer program. The controller further includes control inputs connected to a second end of the handle, wherein the spherical object is placed in contact with a surface when held by the handle and the circuit updates the identified position of the handle as the handle is pivoted on the surface. The control inputs providing commands that are exchanged with the game console to further interact with the computer program.

In another embodiment, an input device for interfacing with a game console to interact with a computer program. The input device includes a controller having a handle with a first input area and a second input area. The first input area is located on a side surface, and the second input area is located on a posterior end. The input device has a spherical section connected to an anterior end of the controller. A first circuit is included to detect when the spherical section is in contact with a surface and enable the second input area to receive control input for the computer program. A second circuit is provided to identify a position of the handle relative to the surface. The second circuit includes communication logic to communicate the identified position and control input to the game console during interaction with the computer program.

BRIEF DESCRIPTION OF THE DRAWINGS

The invention, together with further advantages thereof, may best be understood by reference to the following description taken in conjunction with the accompanying drawings.

FIG. 1A through FIG. 1G-3 are exemplary illustrations of a controller, in accordance with one embodiment of the present invention.

FIG. 5A-5E and 5F-1 through 5F-3 are an exemplary illustrations of the use of a controller in joystick mode, in accordance with embodiments of the present invention.

DETAILED DESCRIPTION

An invention is disclosed for a game console controller. The controller can be grasped or held in a variety of positions that allows game developers to enhance user interaction and realism. The controller may includes motion detection hardware and is capable of receiving and sending wireless communications to and from the game console. Additionally, the controller can include features that enable optical or visual tracking of the controller within a zone of play.

For example, a known geometric shape can be attached to the controller than can be optically tracked by a camera that is connected to the game console. In examples, and without limitation of other shapes, the shape may be a spherical object, a partial sphere, an imperfect sphere, an ellipsoid, a prolated spheroid, an oblated spheroid, a cube, a circle, a block, a triangle, a tetrahedron, a dodechaderon, a small stellated dodecahedron, an octagonal prism or other polyhedrons. Though often referred to as a sphere throughout the document, the shape of the object can be any shape that is recognizable from multiple angles.

In some embodiments, it is also possible to enable detachment of the geometric shape. The geometric shape can also be pivoted about a connection point, replaced with other sizes, colors, shapes, and/or textures.

It will be obvious, however, to one skilled in the art, that the present invention may be practiced without some or all of these specific details. In other instances, well known process operations have not been described in detail in order not to unnecessarily obscure the present invention.

Figure 1C:
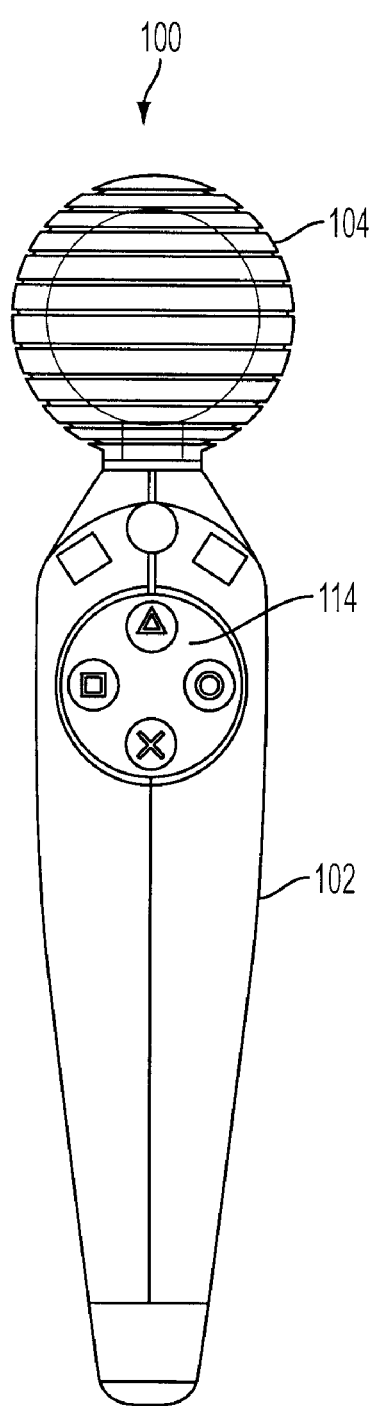

FIG. 1A through FIG. 1H-3 are exemplary illustrations of a controller 100, in accordance with one embodiment of the present invention. The controller 100 is used to accept user input and transmit the user input to a game console. The controller 100 has a handle 102 and a spherical object 104 is connected to one end of the controller 100. In one embodiment, the spherical object 104 defines an anterior end of the controller 100. The view illustrated in FIG. 1A shows a bottom surface of the controller 100 with posterior triggers 106a and 106b and anterior triggers 108a and 108b. In FIG. 1B, a posterior input 110 is visible located on the posterior of the handle 102.

Figure 1D:
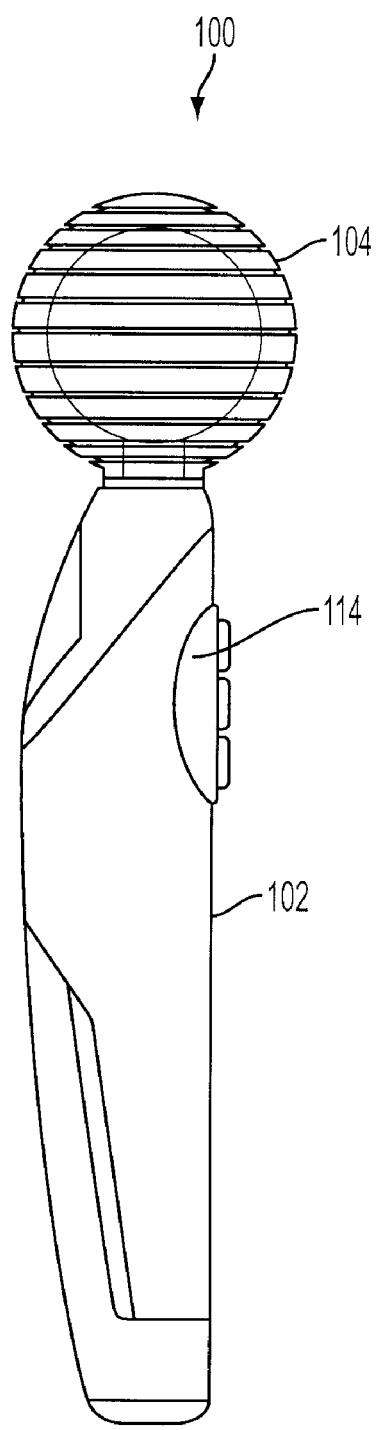
Figures 1, 1E, 2, 3:
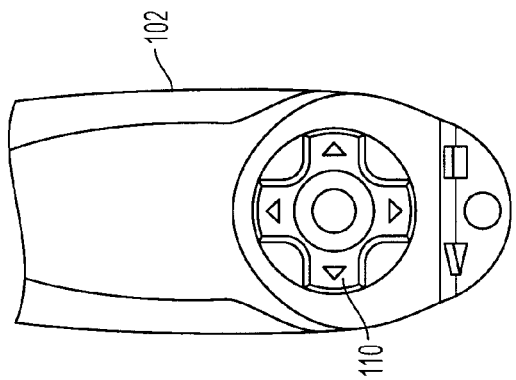
Figures 1, 1E, 2:
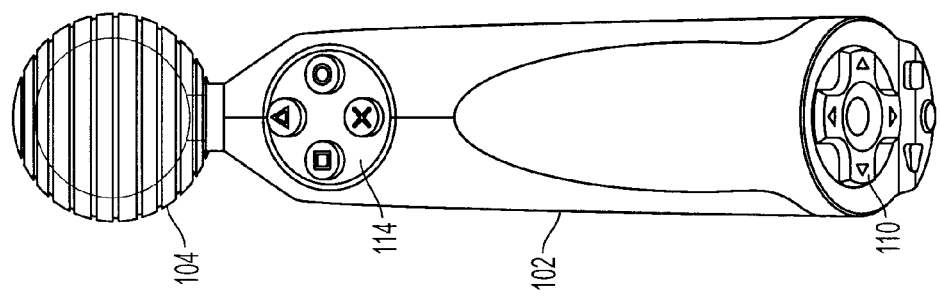
Figures 1, 1E:
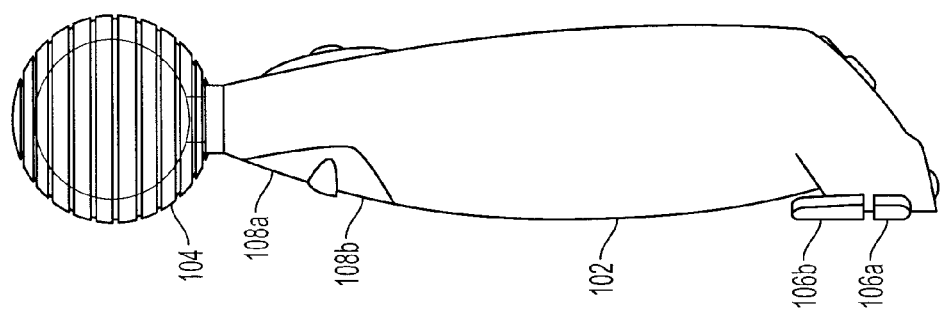

FIG. 1C is a top view and FIG. 1D is a left view of another embodiment of the controller 100. In this embodiment, an anterior input 114 is visible on the top surface of the handle 102. FIGS. 1E-1 through 1E-3 illustrate another embodiment of the controller 100 with both the anterior input 114 and the posterior input 110. FIG. 1E-1 is a left view of the controller 100 illustrating exemplary placements for the anterior triggers 108a and 108b and the posterior triggers 106a and 106b. FIG. 1E-2 is a top view of the controller 100 that illustrates the anterior input 114 relative to the spherical object 104. In this embodiment, the anterior input 114 is a collection of input buttons. FIG. 1E-2 also illustrates an exemplary location and orientation for the posterior input 110. FIG. 1E-3 is a detail of the posterior input 110. In this embodiment, the posterior input 110 is a directional pad that can be used to provide directional input.

Figures 1, 1F, 2:
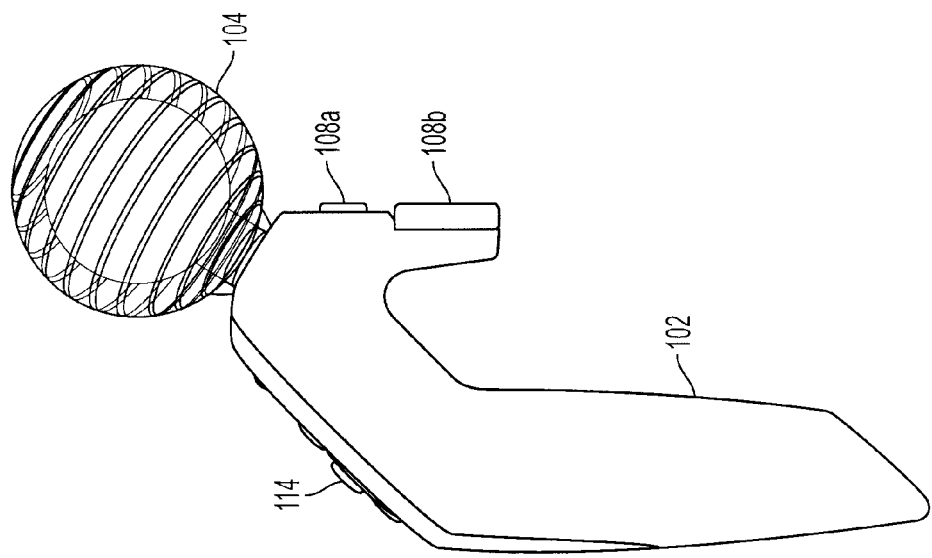
Figures 1, 1F:
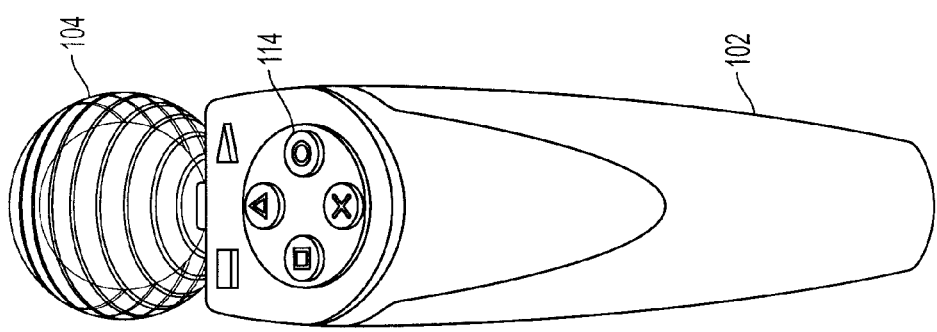
Figures 1, 1G, 2, 3:
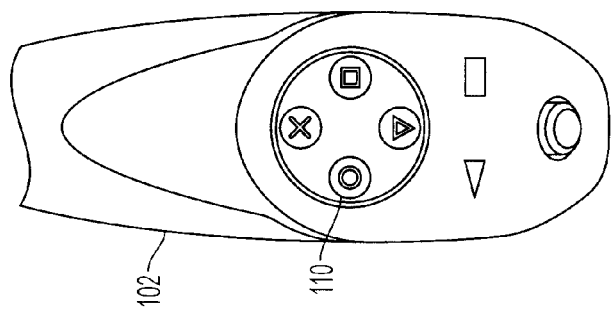
Figures 1, 1G, 2:
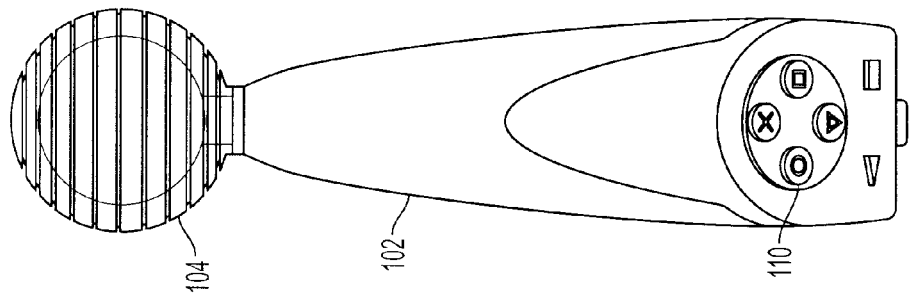
Figures 1, 1G:
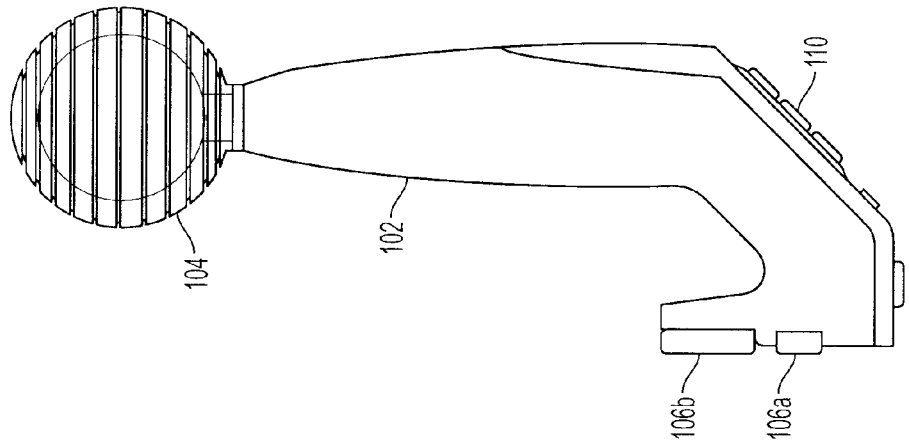

FIG. 1F-1 is a top view and FIG. 1F-2 is a right view of another embodiment of the controller 100. This embodiment has a body 102 with the anterior input 114 and anterior triggers 108 and 108b. Though not shown, in other embodiments, the body 102 could also include posterior triggers and a posterior input. FIGS. 1G-1 through 1G-3 illustrate still another embodiment of the controller 100. FIG. 1G-1 is a left view of the controller 100 and FIG. 1G-2 is a top view of the controller 100. The spherical object 104 remains at the anterior of the handle 102 and the posterior input 110 is located toward the posterior of the controller 100.

The spherical object 104 of the controller 100 can be different colors, and in one embodiment, the spherical object 104 is internally illuminated. The color in the spherical object 104 can be driven by RGB (Red Green Blue) Light-Emitting Diodes (LEDs) inside the spherical object 104 or other light emitting technologies. Additionally, the brightness of the illuminated spherical object can be controlled in order to track the spherical object under different camera exposure settings. In one embodiment, the color of the spherical object is used to differentiate controllers from different users. For example, the controller for a first user can be set to a blue hue, while the controllers for a second user can be set to a red hue. In another embodiment, controllers held by the same user can have different colors. For example, a controller held in a user's right hand could have a different shade of blue than the controller held in the user's left hand.

The controllers 100 discussed above are designed for one-hand use, but controllers with an attached spherical object that require two hands can also be tracked using embodiments described herein. In one embodiment, the two controllers held by the user with different hands are identical, and in another embodiment the controllers are different. Typically, the controllers will be very similar, being different just in the buttons at each controller. In one embodiment, the controller includes a Universal Serial Bus (USB) connection for charging the controller, Bluetooth for wireless communication with the console, and buttons such as start, select and PS.

In one embodiment, the spherical object 104 is about 4 centimeters in diameter, but other sizes are also possible as a spherical object 104 with a larger size may help with visual recognition. Compared with a spherical object with a diameter of about 4 centimeters, a spherical object with about a 5 centimeter diameter may provide about 55 percent more pixels for image recognition.

Figure 2C:
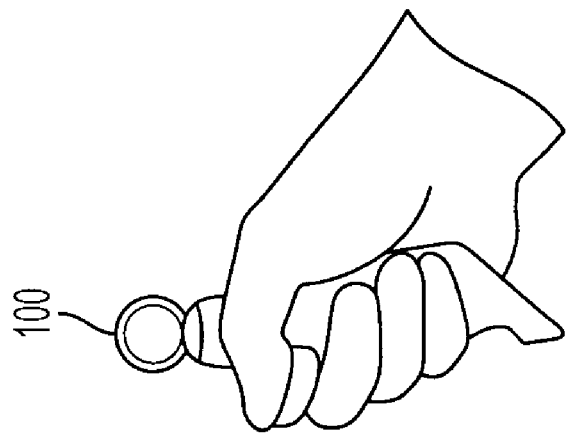
FIGS. 2A-2C depict different operational modes for the game controller of FIGS. 1A through 1G-3, in accordance with one embodiment of the present invention
Figure 2B:
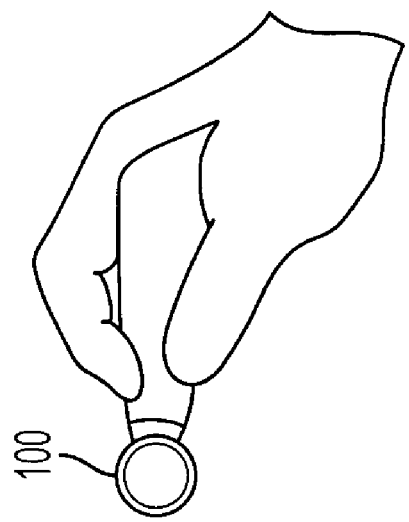
Figure 2A:
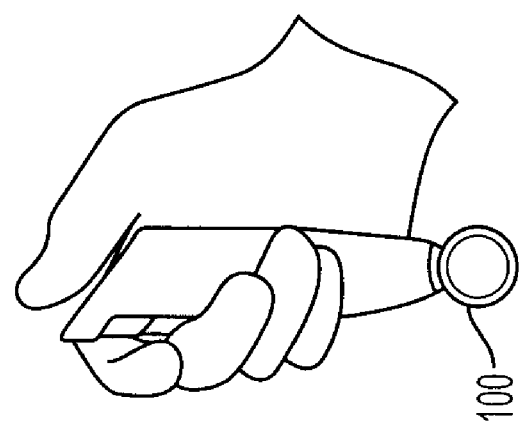

FIGS. 2A-2C depict different operational modes for the game controller 100 of FIGS. 1A through 1G-3, in accordance with one embodiment of the present invention. FIG. 2A shows use of the controller 100 in a "joystick" mode, where the controller 100 is held so the spherical object is located at the bottom of the controller. In this configuration, the controller 100 can be used like a joystick by pivoting about a contact point between the spherical object and a surface. In another embodiment of joystick mode, user input is detected by measuring force applied between the handle 102 and the spherical object 104. In this embodiment, sensors such as, but not limited to strain gauges measure the amount of force applied to the handle and translate the force to action on the screen.

When the controller 100 is held in joystick mode, a user can manipulate a posterior input with their thumb while the posterior triggers can be manipulated with an index or middle finger. As a result, a user holding a controller 100 in each hand in joystick mode can achieve the same functionality as a Sony DualShock®3 controller from Sony Computer Entertainment America Inc.

FIG. 2B shows a controller 100 behind held in a "pointer" configuration. The spherical object faces a camera for visual identification, and the anterior triggers and anterior input user input. Pointer mode can be use in games where the controller 100 is a paint brush, a flashlight, a pointer, a firing weapon, etc. FIG. 2C illustrate the use of a controller 100 in wand mode. As previously discussed, in one embodiment, the controller 100 includes anterior input and anterior trigger. The anterior input can be manipulated with the thumb while the anterior triggers can be manipulated with the index or middle fingers. The wand mode can be used as a magic-wand, a music director's baton, a tennis racket, a hatchet or similar weapon, a tool such as a pick, an umbrella, a rope, etc.

In one embodiment, the controller 100 has motion detection hardware that can determine translation and rotation of the controller 100. In some embodiments, the anterior input is a directional pad while the posterior input are input buttons. In another embodiment, both the anterior inputs and the posterior inputs are removable plates that allow users to choose various input configuration, as described below with respect to FIGS. 2D-2G.

Figure 2G:
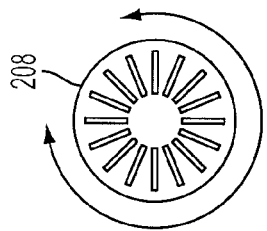
FIGS. 2D-2G show an embodiment of the controller with configurable anterior and posterior inputs, in accordance with one embodiment of the present invention.
Figure 2F:
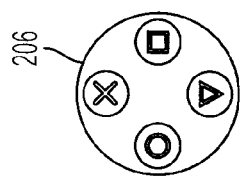
Figure 2E:
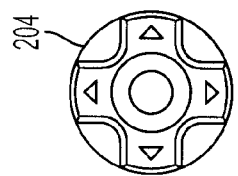
Figure 2D:
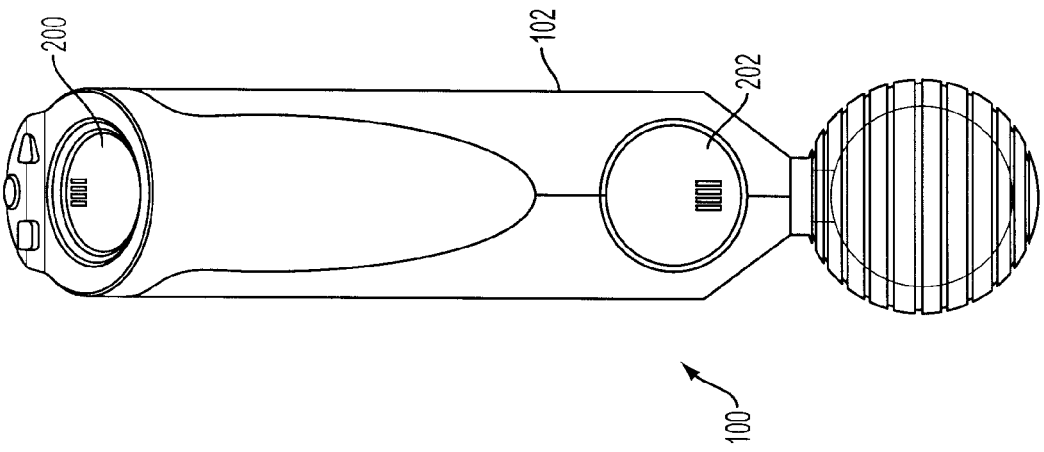

FIGS. 2D-2G show an embodiment of the controller 100 with configurable anterior and posterior inputs, in accordance with one embodiment of the present invention. FIG. 2D is an illustration of a controller 100 with interchangeable anterior and posterior inputs. In this embodiment, the handle 102 has posterior area 200 and anterior area 202 that receive various input faceplates illustrated in FIG. 2E-2G. The posterior area 200 and anterior area 202 include electrical contacts and retaining hardware to hold an installed faceplate in place. The faceplates illustrated in FIG. 2D-2G can be attached to the handle 102, at either the posterior area 200 or the anterior area 202. In another embodiment, the faceplates are not interchangeable and so faceplates for the anterior area will not fit in the posterior area.

FIG. 2E shows a directional pad 204 faceplate. Installation of the directional pad 204 allows a user to control movement. In one embodiment, the direction pad 204 could be used to control secondary motion of a character in a video game. For example, the motion detection hardware of the controller can be used to control locomotion of a character in a first person shooter game, while the direction pad 204 could be used to control head movement of the character. Such an embodiment would increase realism by allowing a player to move in a first direction while looking in a second direction.

FIG. 2F is an illustration of a button input 206 faceplate. Installation of the button input 206 allows a user to provide additional input. In one embodiment, the individual buttons of the button input 206 are mapped to perform specific actions for specific games. For example, the buttons can be used to open doors, accept commands, cancel commands, act as an accelerator or brake for a car, etc. FIG. 2G is an illustration of a touch pad faceplate. As shown, the touchpad 208 can be used to scroll through menu selections similar to a jog wheel. In another embodiment, the touchpad 208 can be used to control a cursor similar to a touchpad on a notebook computer. The attachments include electrical connections and a mechanical grip that snaps the attachments securely when placed on the controller.

Figure 3A:
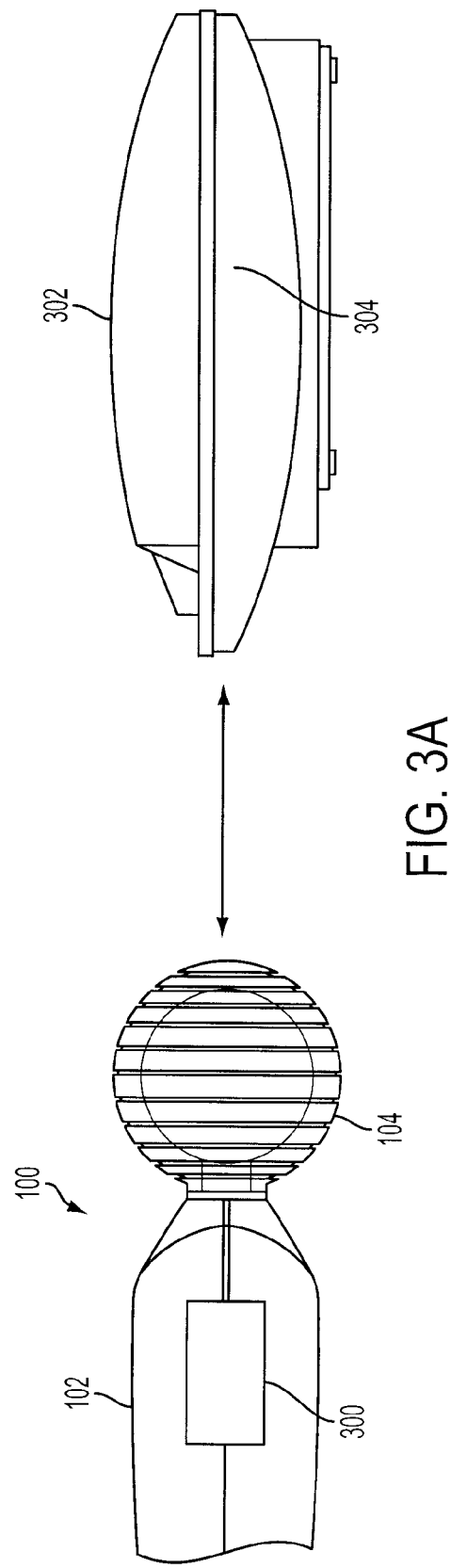
FIG. 3A is an exemplary illustration of communication between a controller and a game console, in accordance with one embodiment of the present invention.

FIG. 3A is an exemplary illustration of communication between a controller 100 and a game console 302, in accordance with one embodiment of the present invention. The controller 100 has hardware 300 that can include, but is not limited to communications hardware and motion detection hardware. In one embodiment, the motion detection hardware includes combinations of gyroscopes, accelerometers, ultrasonic transmitters and receivers, and/or magnetometers that are capable of detecting translation and rotation of the controller in six-axis. For example, the motion detection hardware can detect motion that vertical, horizontal, lateral, or combinations thereof. Similarly, the motion detection hardware can detect yaw, pitch, roll and combinations thereof.

In one embodiment, data from the motion detection hardware is sent from the controller 100 to the game console using communications hardware. The communications hardware for the controller 100 can be integrated into the handle 102 along with the motion detection hardware. The communications hardware includes a radio and an antenna and utilize radio communications protocols such as, but not limited to, Bluetooth, wi-fi, or other radio protocols described in IEEE 802.1x.

The game console 302 has corresponding console communications hardware 304. The console communications hardware 304 can receive and send data to and from the controller 100. In one embodiment, the game console 302 processes the data from the motion detection hardware. In another embodiment, the controller 100 processes the data from the motion detection hardware before it is sent to the game console 302. In still other embodiments, the controller partially processes data from the motion detection hardware before it is broadcast to the game console 302.

Figure 3B:
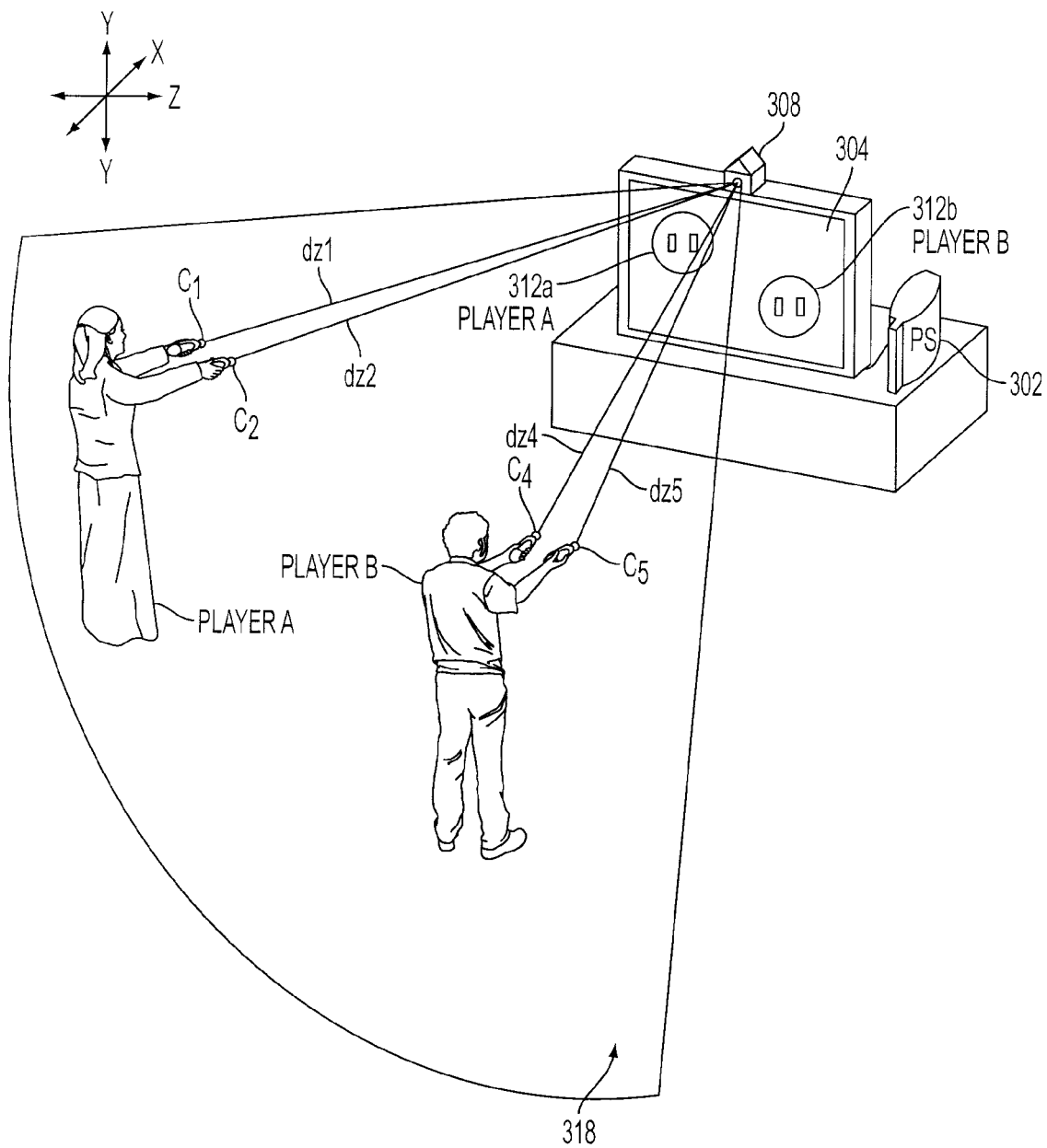
FIG. 3B shows a schematic diagram of a multiplayer environment and the use of visual information to determine the locations of the different controllers held by the players, in accordance with one embodiment of the present invention.

FIG. 3B shows a schematic diagram of a multiplayer environment and the use of visual information to determine the locations of the different controllers held by the players, in accordance with one embodiment of the present invention. Image capture device 308 obtains an image of playing field 318 and the image is analyzed to obtain the location of ball-attached controllers $C_1$, $C_2$, $C_4$ and $C_5$. Distances $d_{z1}$, $d_{z2}$, $d_{z4}$, and $d_{z5}$ are estimated by analyzing the shape, position, movement, angle, etc. of the respective balls in the captured image. The game console 302, uses the obtained coordinates and distances to produce pointers, or control avatars 312a and 312b on screen 306. A typical distance for good image recognition is about 1 foot, 2 feet, 3 feet, 5 feet up to 10 feet or more. One advantage of using visual recognition is that improvements in image capture and image recognition can be included in the system without having to change the controller.

Figure 3C:
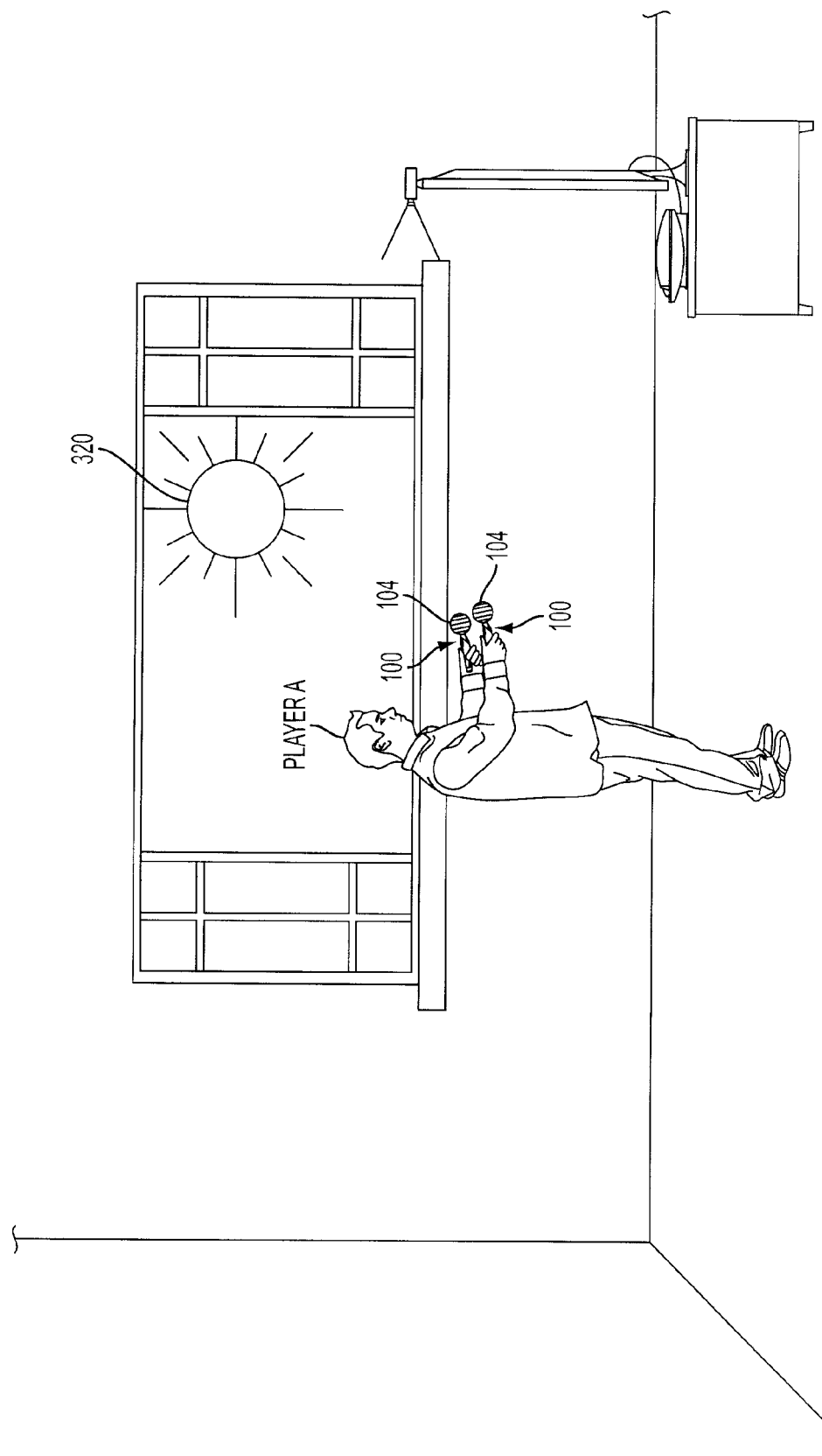
FIG. 3C shows controllers with spherical objects that can change, modify or improve its appearance to improve detection depending on the lighting conditions in the field of play, in accordance with one embodiment of the present invention.

FIG. 3C shows controllers 100 with spherical objects 104 that can change, modify or improve its appearance to improve detection depending on the lighting conditions in the field of play, in accordance with one embodiment of the present invention. If the field of play is nearby a source of light (natural or artificial), such as a window that can receive light from sun 462, then visual detection may be affected depending on the time of the day or night and the amount of light in the field of play. The appearance of the spherical object also is affected by the angle of impact from the sunrays. For example, the appearance of the spherical object will be different if the sunlight hits the ball at the front, back, or side. Similarly, artificial light sources such as lamps (or the like) can affect visual detection depending on whether the lamp is ON or OFF, or color lighting is used.

In one embodiment, the spherical object 104 includes a light source inside the spherical object 104 that can be turned on or off to improve spherical object 104 visibility. The light source can be turned on by the player or by the game console in communication with the controller 100 that includes the spherical object 104. In another embodiment, spherical object 104 can include a clear shell. In another embodiment, the shell can be frosted so as to be translucent. Still further, the shell (either clear or frosted), can take on any shade, color or texture. For example, if the shell is frosted or has a shade, then the spherical object 104 can be made to appear darker when not illuminated. An example shade can be a gray, black, silver, or combinations of colors, so long as the color or shade provides good differentiating contrast, when placed in a particular environment. The shell can be made from many materials, such as plastics, rubber, glass, foam, molded materials, etc. And, these materials can take on any color, whether applied, dyed or molded.

Still further, the light source inside spherical object 104 can reproduce different colors, such as white or yellow, while other colors are also possible. The illuminated spherical object can improve detection in low ambient light conditions, while a darker color ball improves detection in situations with bright light.

Figure 4A:
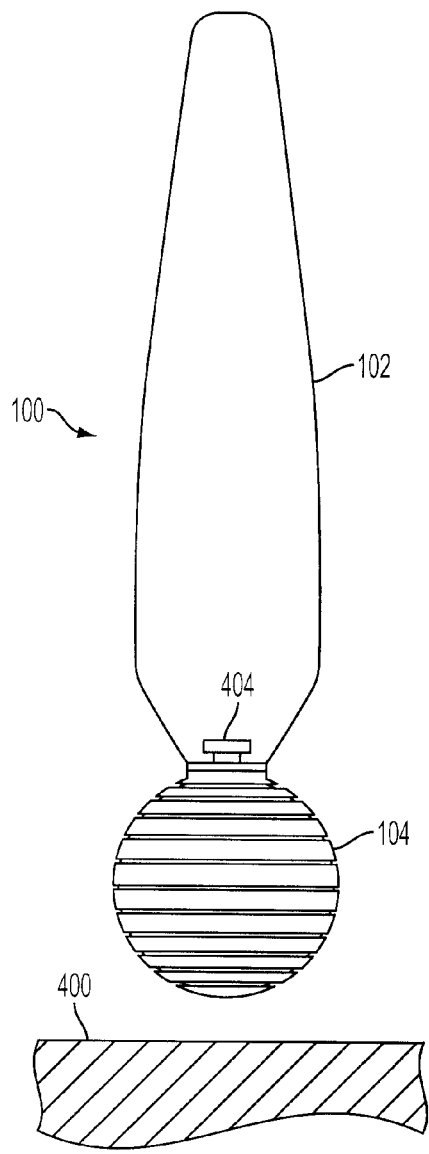
FIG. 4A and FIG. 4B illustrate the use of a controller as a joystick, in accordance with one embodiment of the present invention.
Figure 4B:
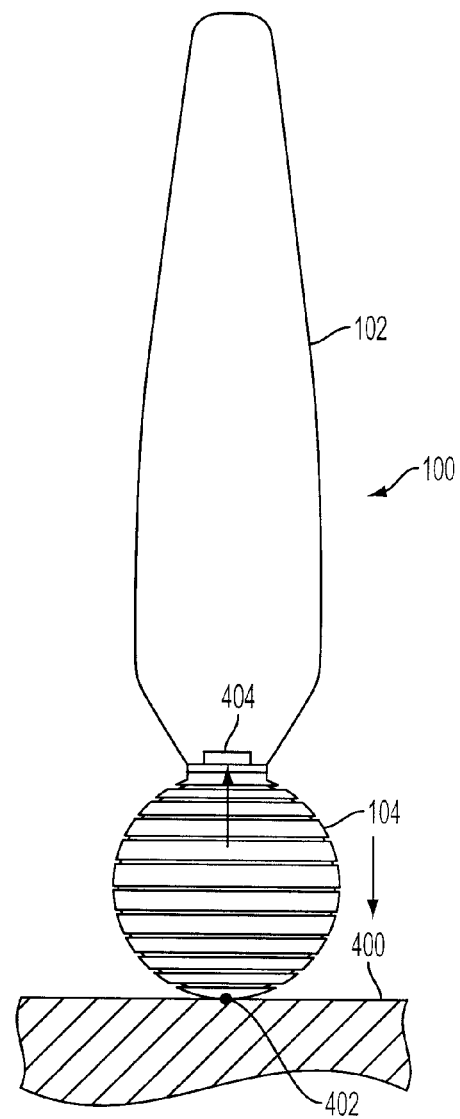

FIG. 4A and FIG. 4B illustrate the use of a controller 100 as a joystick, in accordance with one embodiment of the present invention. In FIG. 4A, the controller 100 is shown with the spherical object 104 above a surface 400 whereas in FIG. 4B, the spherical object 104 is in contact with the surface 400 at pivot point 402. Sensor 404 detects when the spherical object 104 contacts the surface 400. The placement of sensor 404 between the spherical object 104 and the handle 102 is intended to be exemplary, and should not be construed as limiting.

When the sensor 404 determines that the spherical object 104 is in contact with the surface 400, the controller automatically switches to joystick mode. Entering joystick mode disables the anterior input and anterior triggers while enabling the posterior input and posterior triggers. Likewise, entering joystick mode can configure the motion detection hardware to determine relative motion of the handle 102 about the pivot point 402. The pivot point 402 is not a set physical location on the spherical object 104, but instead is the location at which contact occurs between the spherical object 104 and the surface 400.

In another embodiment, the pivot point is at a fixed location between the spherical object and the handle. The pivot point can allow translation and rotation of the handle relative to the spherical object. In one embodiment, the physical translation of the handle is determined and correlated to action on the screen. In other embodiments, strain gauges associated with the handle and the spherical object determine how much force is being applied and correlate the applied force to action on the screen.

Figure 4C:
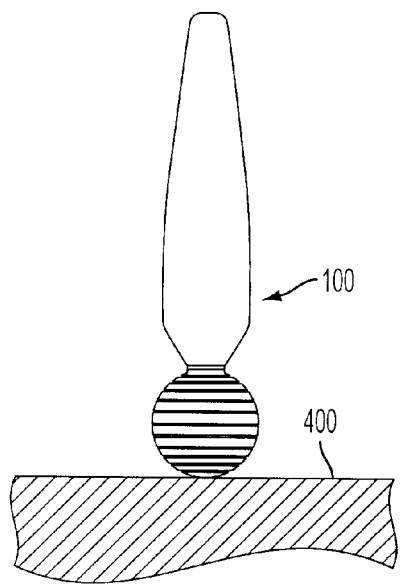
FIGS. 4C-4H illustrate various types of surfaces the controller may be placed on in joystick mode, in accordance with various embodiments of the present invention.
Figure 4D:
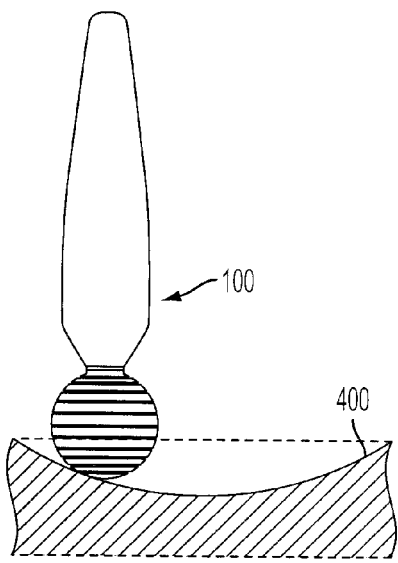
Figure 4E:
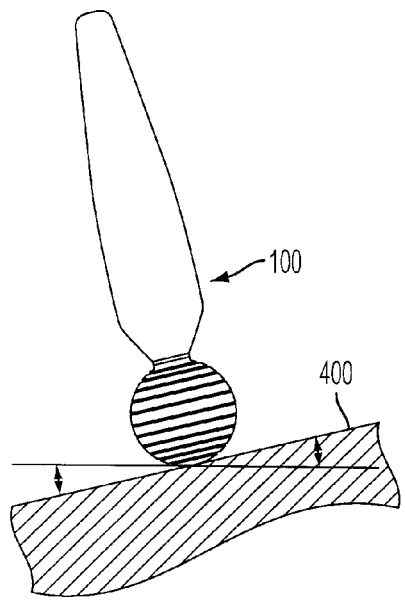
Figure 4F:
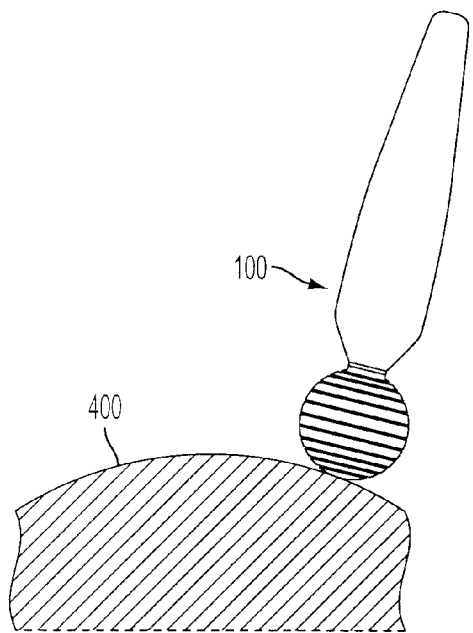
Figure 4G:
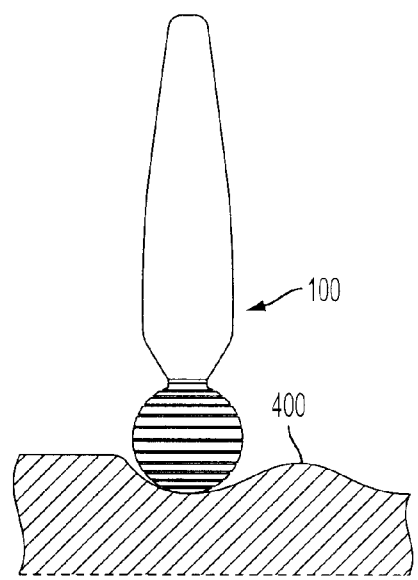
Figure 4H:
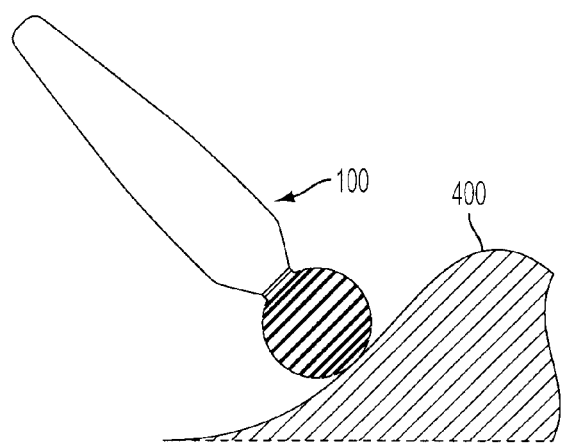

FIGS. 4C-4H illustrate various types of surface 400 the controller 100 may be placed on in joystick mode, in accordance with various embodiments of the present invention. FIG. 4C shows the controller 100 on a relatively flat surface 400 while the surface 400 of FIG. 4D is concave. In FIG. 4E, the surface 400 is a relatively flat surface, that is tilted at an angle from horizontal. FIG. 4F shows an exemplary embodiment where the controller 100 is shown on surface 400 that is convex. In yet another embodiment illustrated in FIG. 4G, the spherical object 104 of the controller 100 is in contact with surface 400, an irregular surface. The embodiment illustrated in FIG. 4G could be encountered when the controller 100 is placed in contact with a padded armrest of a sofa, armchair, or a user's leg. In FIG. 4H, the spherical object 104 is shown in contact with surface 400, another irregular surface.

When the controller 100 enters joystick mode a reference surface is established. In one embodiment, the reference surface is determined based on the relative to the position of the handle 102 to the surface 400. The relative position of the handle to the surface can be determined based on data from position sensors associated with the controller. In another embodiment, visual tracking data is used in conjunction with data from position sensors to determine the relative position of the handle to the surface. In still other embodiments, the relative position of the handle to the surface can be determined using a combination of ultrasonics, visual tracking data and position sensor data. The example provided for determining the relative position of the handle to the surface should not be construed as limiting. Additional techniques can be employed that have not been discussed.

FIG. 5A-5E are an exemplary illustrations of the use of a controller 100 in joystick mode, in accordance with embodiments of the present invention. User A is shown seated in a chair 500 while holding the controller 100 that includes a spherical object 104 in joystick mode. As shown in detail 504, the spherical object 104 is in contact with an armrest 506 of the chair 500 when the controller 100 is held in joystick mode. As previously discussed, sensors can detect when the spherical object 104 is in contact with an object such as the armrest 506 and enable joystick mode.

When the controller 100 enters joystick mode, data from the hardware associated with the controller can determine relative motion of the controller about a pivot point. In another embodiment, visual information is combined with data from the controller hardware to determine relative motion of the controller about a pivot point. Using data from the controller hardware with or without visual information allow the controller 100 to be placed on the irregular surfaces such as a crowned armrest 506.

Figure 5A:
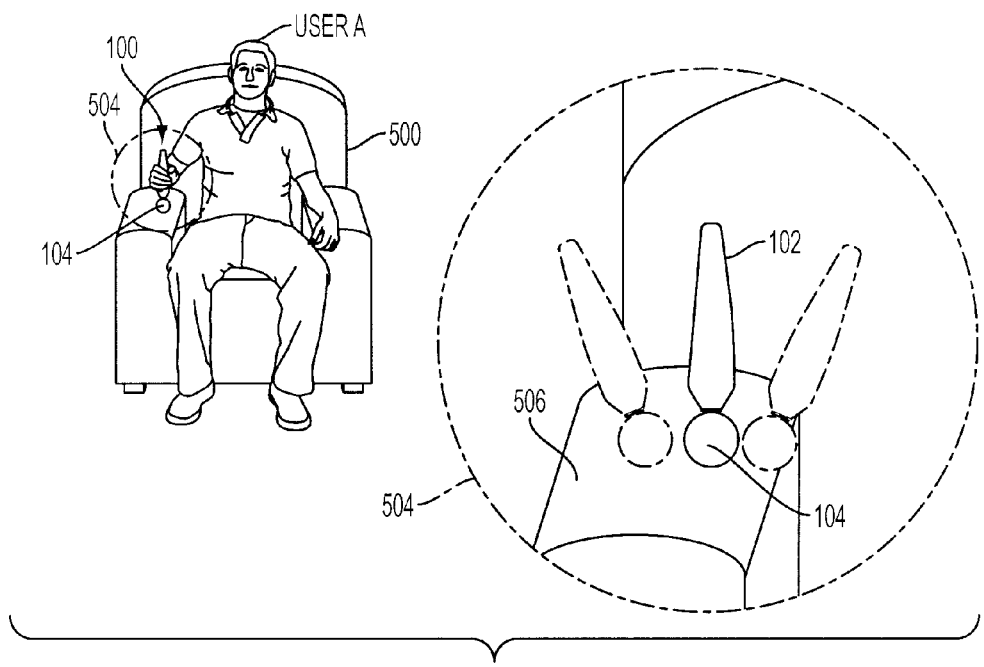
Figure 5B:
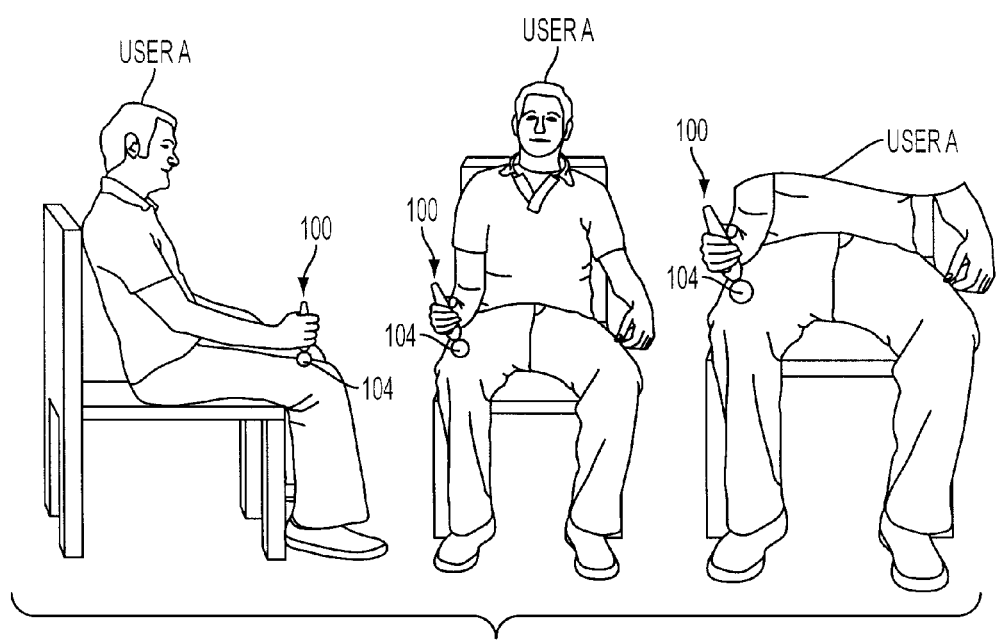

FIG. 5B provides exemplary illustrations of the controller 100 being used as a joystick. FIG. 5B illustrates a side and front view of user A holding a controller against his leg to enable joystick mode. In this embodiment, the controller 100 can determine its relative position based on data from the controller hardware and visual information.

Figure 5C:
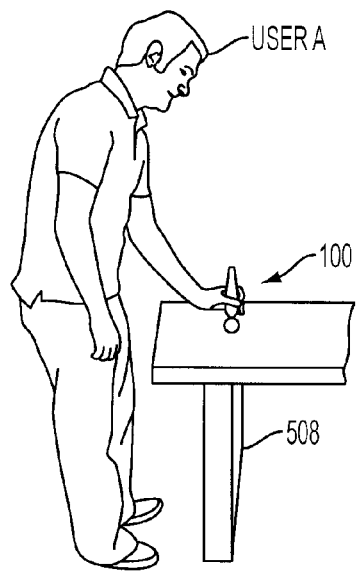
Figure 5D:
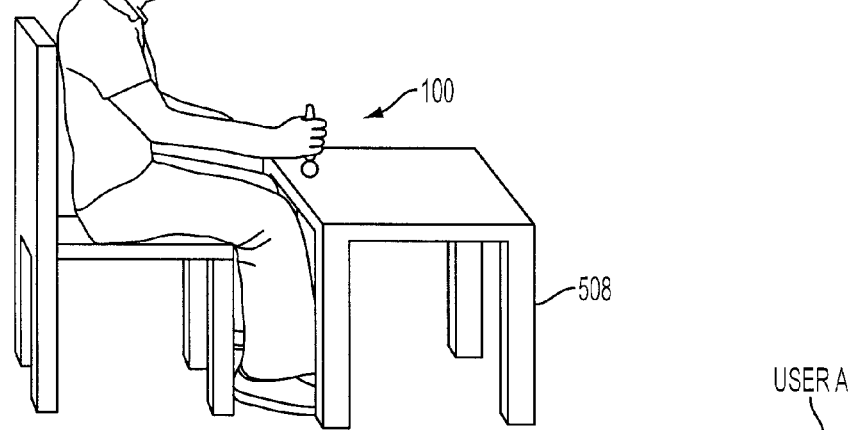
Figure 5E:
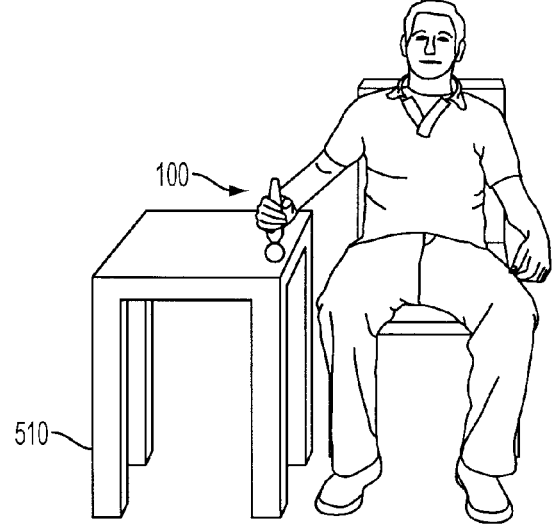

FIG. 5C-5E are additional illustrations of a controller 100 used in joystick mode, in accordance of embodiments of the present invention. FIG. 5C shows user A engaging joystick mode of the controller 100 by holding the spherical object against a table 508. In another embodiment shown in FIG. 5D, user A is shown seated on a chair holding the controller 100 against a table 508 to engage joystick more. In still yet another embodiment, while user A sit in a chair, a side table 510 supports the controller 100 held by user A. Though FIGS. 5C-5E show the controller being supported by a table, generally considered a rigid surface, the controller would also function in joystick mode if placed against a conformal surface such as, but not limited to a pillow or other soft surfaces.

Figures 3, 5F:
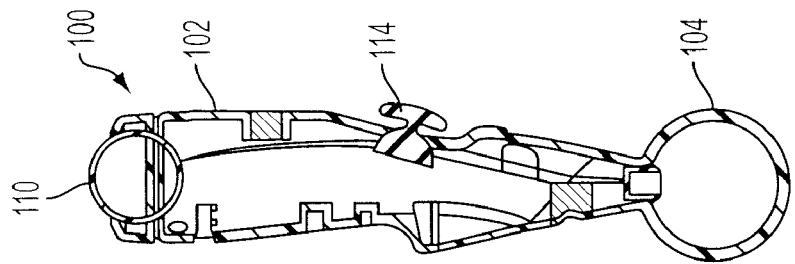
Figures 2, 5F:
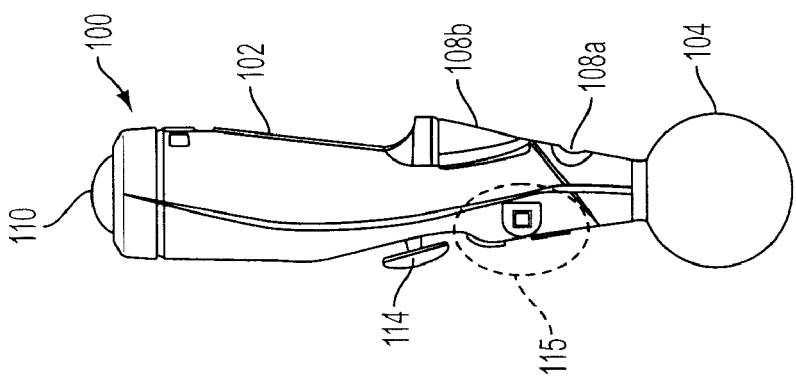
Figures 1, 5F:
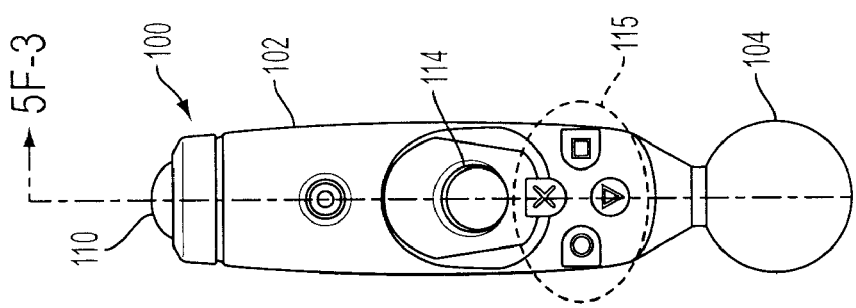

FIGS. 5F-1 is a top view and FIG. 5F-2 is a side view of another embodiment of the controller 100. In this embodiment the anterior input 114 is a joystick with supplemental input 115 located above the joystick. When the controller 100 is held in wand mode the joystick can be manipulated with a user's thumb. Additionally, the joystick is located in a depression or indentation in the handle 102 to allow the thumb to remain at a neutral angle. The supplemental input 115 includes buttons designated with graphical illustrations of an "X", a circle, a square and a triangle. In one embodiment, the X button is partially within the indentation in the handle 102 so less movement is needed to shift between pressing the X button and manipulating the joystick. As shown in FIG. 5F-2, the controller 100 also includes anterior triggers 108*a* and 108*b* that can be manipulated with a user's index finger or other fingers.

In embodiments where the controller 100 is manipulated in wand mode, the joystick provides analog input to control aspects of a video game executed by the game console. For example, the joystick can be used to provide character movement for an in-game avatar while movement of the controller 100 can be detected and used to control head movement of the same in-game avatar. Thus, a user can push the joystick forward to enable the in-game avatar to walk forward while physically moving the controller 100 left and right would swivel the view of the in-game avatar left and right. This would allow a more realistic simulation as real-world people can walk in one direction while turning their head to look in a different direction than the direction they are walking.

In embodiments where the controller 100 is manipulated in joystick mode, the posterior input 110 is utilized. As illustrated in FIGS. 5F-1 through 5F-3, the posterior input 110 is a trackball like device that can be manipulated with a user's thumb. FIG. 5F-3 illustrates a cross-section of the controller 100 and more clearly illustrates the trackball as the posterior input 110. The use of a trackball as the posterior input 110 provides an additional method of accepting user input to the controller 100. Thus, while movement of the controller 100 relative to the pivot point can be applied to control of one aspect of a game, application, or graphical user interface for the game console, additional input can be received through the trackball.

For example, in embodiments where the game console is used to access and browse the Internet, use of the controller in joystick mode can be used to control an Internet browser. In one embodiment, the trackball can be used for fine adjustments such as manipulating a cursor on the screen. Movement of the handle as a joystick to the left is the equivalent of pressing a back button on a browser while movement forward and back allows the browser to scroll the website. In other embodiments, movement of the handle as a joystick can be used to control a cursor while the trackball allows a user to scroll up, down, and sideways. Alternatively, when used in joystick mode the controller 100 can be held stationary while the track ball is used to provide user input. In each of the trackball embodiments, the trackball is further configured to be pressed down similar to a button. This allows In other embodiments the posterior input 110 could use buttons similar to those shown in FIG. 1B. In still other embodiments, a directional-pad or even a small thumb operated joystick could be used as the posterior input.

Figure 6:
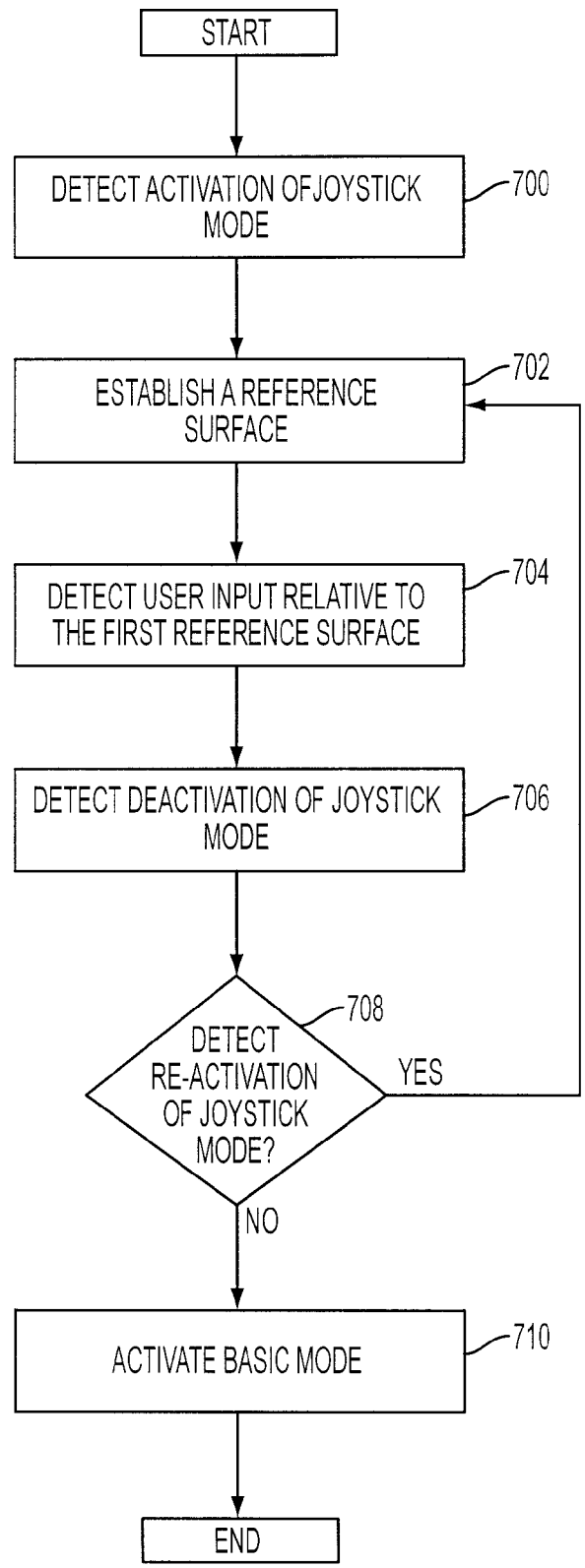
FIG. 6 illustrates another implementation of the controller, in accordance with one embodiment of the present invention.

FIG. 6 illustrates another implementation of the controller 100, in accordance with one embodiment of the present invention. In this embodiment, the handle 102 of the controller 100 is grasped by one hand of user A while the other hand of user A manipulates the spherical object 104. In this embodiment, strain gauges between the spherical object 104 and the handle 102 detect the force applied and correlate the force into on-screen action. This embodiment allows user A to manipulate the spherical object 104 relative to the handle 102. It maybe advantageous to some demographics to manipulate the spherical object 104 rather than the handle due to undeveloped or diminished fine motor control. Additional input from user A can be supplied as the anterior input and anterior triggers may also be utilized in this embodiment.

Figure 7A:
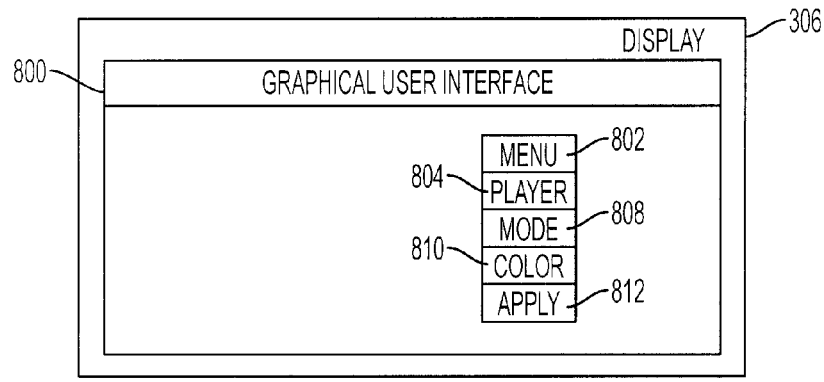
FIG. 7A is a flow chart describing exemplary operations to use the controller in joystick mode, in accordance with one embodiment of the present invention.

FIG. 7A is a flow chart describing exemplary operations to use the controller in joystick mode, in accordance with one embodiment of the present invention. Operation 700 detects activation of joystick mode. In one embodiment, the controller includes a sensor or combinations of sensors to automatically detect conditions that place the controller in joystick mode. For example, a sensor such as, but not limited to a strain gauge, can detect a compression force indicative of the spherical object being pressed toward the handle or vice versa. When the compression force exceeds a predetermine threshold value, the controller can automatically enter joystick mode. In another embodiment, the compression force would need to exceed the threshold value for a specified period of time before the controller enters joystick mode. In another exemplary embodiment, to avoid accidentally entering joystick mode when the controller is bumped or accidentally placed against an object, an accelerometer can be employed to determine if the controller is substantially vertical before entering joystick mode.

Operation 702 establishes a reference surface and a pivot point. In one embodiment, data from the motion sensors is used to determine a reference surface relative to the pivot point when the controller enters joystick mode. In another embodiment, visual information captured from the camera is used in conjunction with motion sensor data to establish the reference surface. Operation 704 detects user input to the controller relative to the reference surface. Periodic sampling of motion sensor data can be used to determine user input to the controller as either pitch, yaw, roll or combinations thereof relative to the pivot point.

Operation 706 detects deactivation of joystick mode that can occur if a user lifts the spherical object off of the surface. Other modes can now take over before re-entering joystick mode. Operation 708 determines if there is a reactivation of joystick mode. If joystick mode is reactivated, the procedure returns to operation 702. If reactivation of joystick mode is not detected, operation 710 automatically puts the controller into wand mode (or other defined mode). Other game interface functionality can now be carried out at this point.

Figure 7B:
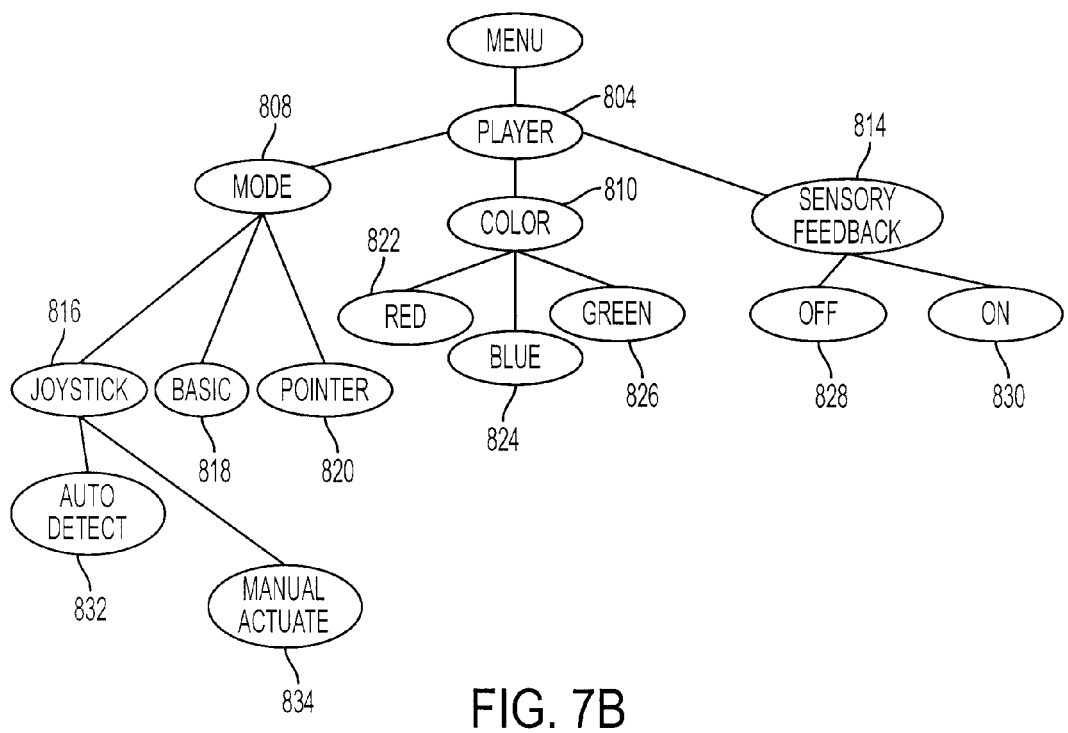
FIG. 7B is an exemplary configuration tree illustration various features of the controllers that can be customized by a user, in accordance with one embodiment of the present invention.

FIG. 7B is an exemplary configuration tree illustration various features of the controllers that can be customized by a user, in accordance with one embodiment of the present invention. The configuration tree shown in FIG. 8B can be used to configure multiple controllers that are used by multiple users. When multiple players are using the game console, the GUI would include selection of which controller is being configured. After determining which controller is being configured, the user can choose to modify the mode 808, color 810 and sensory feedback 814 of the controller. When modifying the mode 808, the user is allowed to choose between modes such as auto 815, joystick 816, wand 818, and pointer 820. Each of the individual modes can allow for additional customization including but not limited to, auto-detection 832 and manual activation 834. In one embodiment, the selection made under mode 808 defines the default mode of the controller for the specified player.

In one embodiment, selecting Color 810 allows a user to define the color of the internal illumination for the spherical object. In this embodiment, the user can select between Red 822, Blue 824 and Green 826. In another embodiment, the user is allowed to select a color from a color gamut displayed within the GUI. The ability to select a color for the spherical object allows multiple users to customize the physical appearance of their controllers. This not only makes it easier for the user to differentiate their controllers it can also simplify visual identification of the controllers as discussed in FIG. 3C.

Another feature that can be configured is Sensory Feedback 814. In one embodiment, the controller includes hardware capable of producing sensory feedback based on events displayed on the screen. For example, in one embodiment, the controller can provide tactile feedback using vibrations generated in response to on screen events. In another embodiment, small speakers installed in the controller can provide audible feedback. While sensory feedback can enhance the realism of a gaming experience, some users may wish to disable the feedback by selecting Off 828. Alternatively, selecting On 830 would enable the controller to provide sensory feedback.

Figure 7C:
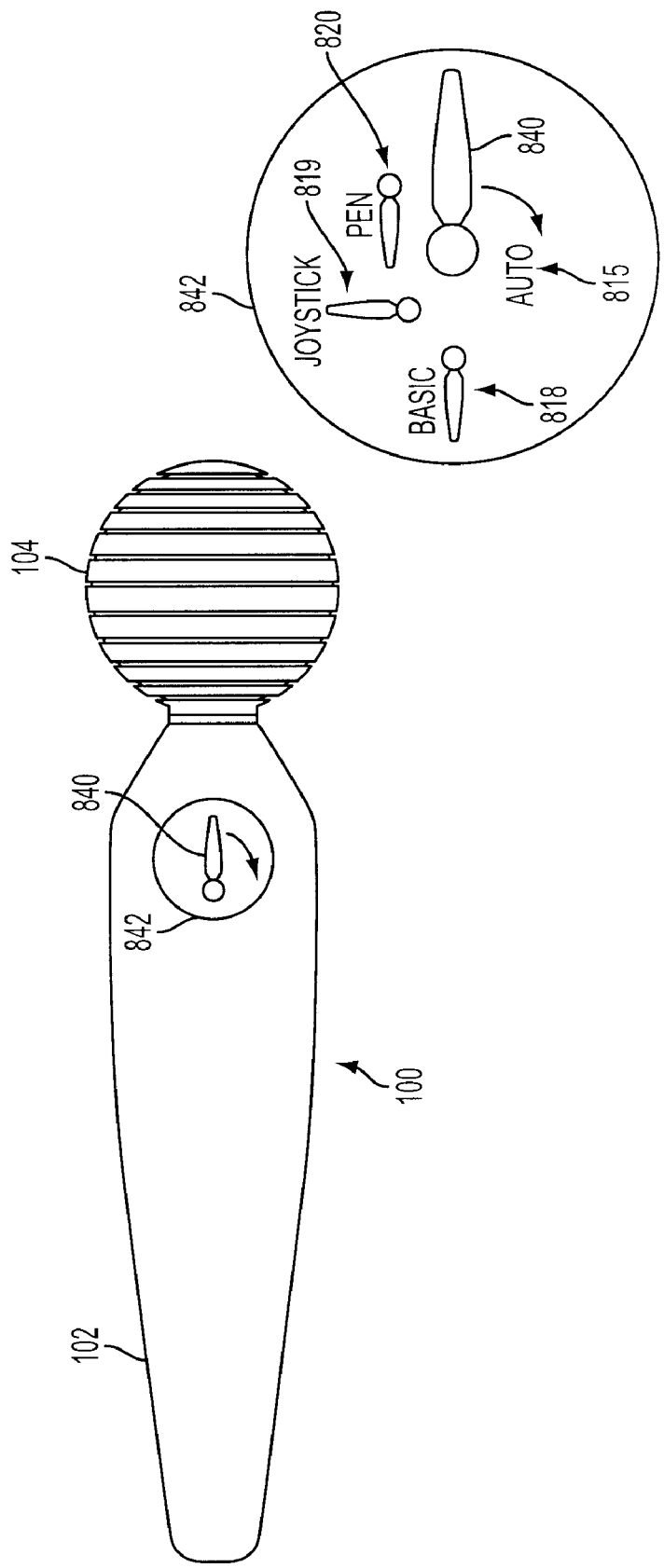
FIG. 7C is a schematic illustrating an exemplary or optional switch that can be used to set the mode of a controller, in accordance with one embodiment of the present invention.

FIG. 7C is a schematic illustrating an exemplary or optional switch 840 that can be used to set the mode of a controller 100, in accordance with one embodiment of the present invention. Detail 842 provides a closer look at the switch 840. In this embodiment the position of switch 840 determines the controller mode rather than a GUI. The switch 840 is located on the handle 102 and has four positions defined as Auto 815, Joystick 819, Wand 818 and Pointer 820. Toggling the switch 840 between the various positions allows the user to rapidly switch controller modes without having to navigate the GUI. In another embodiment, the switch 840 is used in conjunction with the GUI configuration. With such an embodiment, the switch 840 can determine the default controller mode, while the GUI is used to configure other features of the controller.

Figure 8:
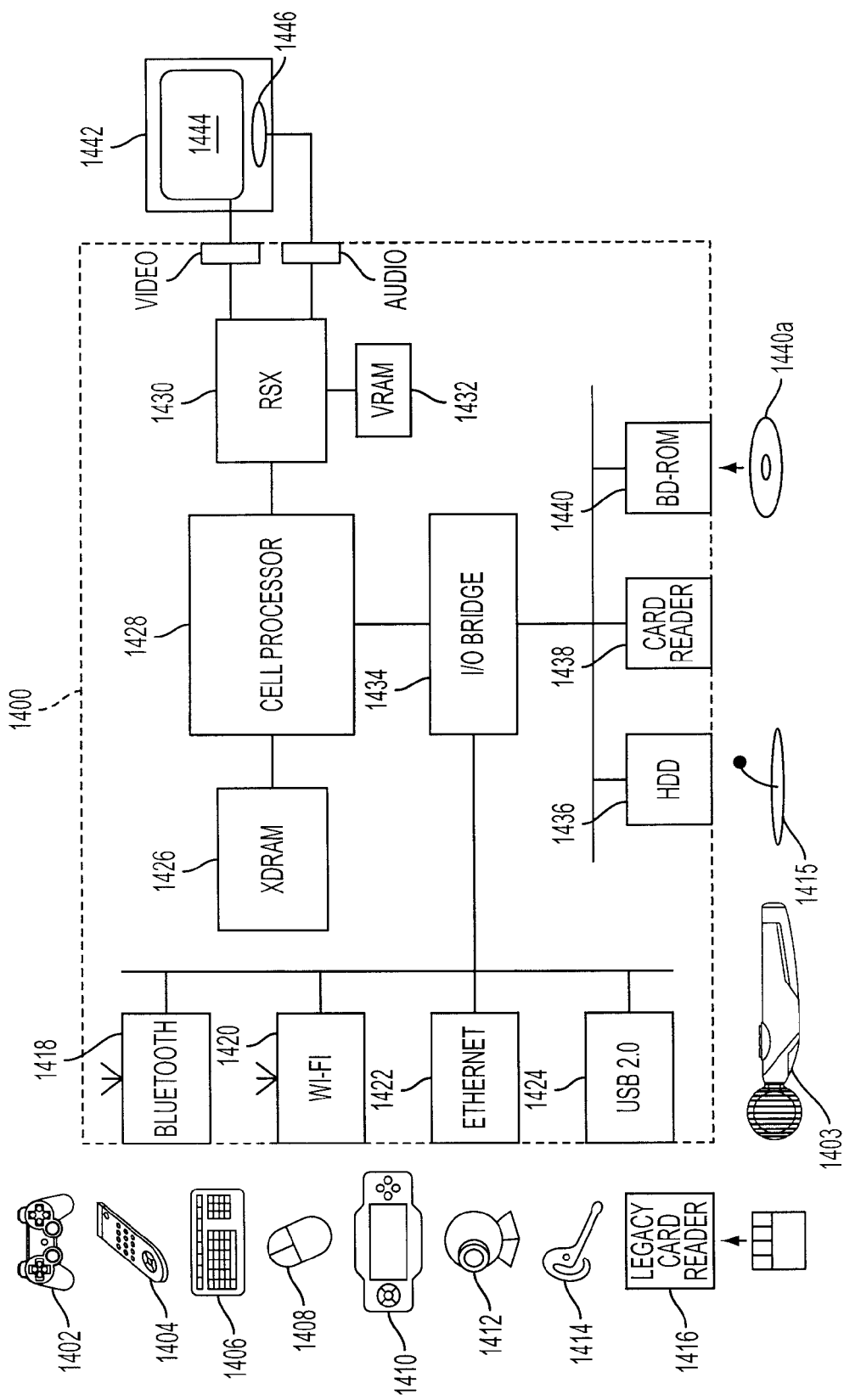
FIG. 8 schematically illustrates the overall system architecture of the Sony® Playstation 3® entertainment device, a game console capable of supporting multiple controllers in accordance with one embodiment of the present invention.

FIG. 8 schematically illustrates the overall system architecture of the Sony® Playstation 3® entertainment device, a game console capable of supporting multiple controllers in accordance with one embodiment of the present invention. A system unit 900 is provided, with various peripheral devices connectable to the system unit 900. The system unit 900 comprises: a Cell processor 928; a Rambus® dynamic random access memory (XDRAM) unit 926; a Reality Synthesizer graphics unit 930 with a dedicated video random access memory (VRAM) unit 932; and an I/O bridge 934. The system unit 900 also comprises a Blu Ray® Disk BD-ROM® optical disk reader 940 for reading from a disk 940a and a removable slot-in hard disk drive (HDD) 936, accessible through the I/O bridge 934. Optionally the system unit 900 also comprises a memory card reader 938 for reading compact flash memory cards, Memory Stick® memory cards and the like, which is similarly accessible through the I/O bridge 934.

The I/O bridge 934 also connects to six Universal Serial Bus (USB) 2.0 ports 924; a gigabit Ethernet port 922; an IEEE 802.11b/g wireless network (Wi-Fi) port 920; and a Bluetooth® wireless link port 918 capable of supporting of up to seven Bluetooth connections.

In operation the I/O bridge 934 handles all wireless, USB and Ethernet data, including data from one or more game controllers 902. For example when a user is playing a game, the I/O bridge 934 receives data from the game controller 902 via a Bluetooth link and directs it to the Cell processor 928, which updates the current state of the game accordingly.

The wireless, USB and Ethernet ports also provide connectivity for other peripheral devices in addition to game controllers 902, such as: a remote control 904; a keyboard 906; a mouse 908; a portable entertainment device 910 such as a Sony Playstation Portable® entertainment device; a video camera such as an EyeToy® video camera 912; and a microphone headset 914. Such peripheral devices may therefore in principle be connected to the system unit 900 wirelessly; for example the portable entertainment device 910 may communicate via a Wi-Fi ad-hoc connection, whilst the microphone headset 914 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 916 may be connected to the system unit via a USB port 924, enabling the reading of memory cards 948 of the kind used by the Playstation® or Playstation 2® devices.

In the present embodiment, the game controller 902 is operable to communicate wirelessly with the system unit 900 via the Bluetooth link. However, the game controller 902 can instead be connected to a USB port, thereby also providing power by which to charge the battery of the game controller 902. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 904 is also operable to communicate wirelessly with the system unit 900 via a Bluetooth link. The remote control 904 comprises controls suitable for the operation of the Blu Ray Disk BD-ROM reader 940 and for the navigation of disk content.

The Blu Ray Disk BD-ROM reader 940 is operable to read CD-ROMs compatible with the Playstation and PlayStation 2 devices, in addition to conventional pre-recorded and recordable CDs, and so-called Super Audio CDs. The reader 940 is also operable to read DVD-ROMs compatible with the Playstation 2 and PlayStation 3 devices, in addition to conventional pre-recorded and recordable DVDs. The reader 940 is further operable to read BD-ROMs compatible with the Playstation 3 device, as well as conventional pre-recorded and recordable Blu-Ray Disks.

The system unit 900 is operable to supply audio and video, either generated or decoded by the Playstation 3 device via the Reality Synthesizer graphics unit 930, through audio and video connectors to a display and sound output device 942 such as a monitor or television set having a display 944 and one or more loudspeakers 946. The audio connectors 950 may include conventional analogue and digital outputs whilst the video connectors 952 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 928. The Playstation 3 device's operating system supports Dolby® 5.1 surround sound, Dolby® Theatre Surround (DTS), and the decoding of 7.1 surround sound from Blu-Ray® disks.

In the present embodiment, the video camera 912 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 900. The camera LED indicator is arranged to illuminate in response to appropriate control data from the system unit 900, for example to signify adverse lighting conditions. Embodiments of the video camera 912 may variously connect to the system unit 900 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 900, an appropriate piece of software such as a device driver should be provided. Device driver technology is well-known and will not be described in detail here, except to say that the skilled man will be aware that a device driver or similar software interface may be required in the present embodiment described.

Figure 9:
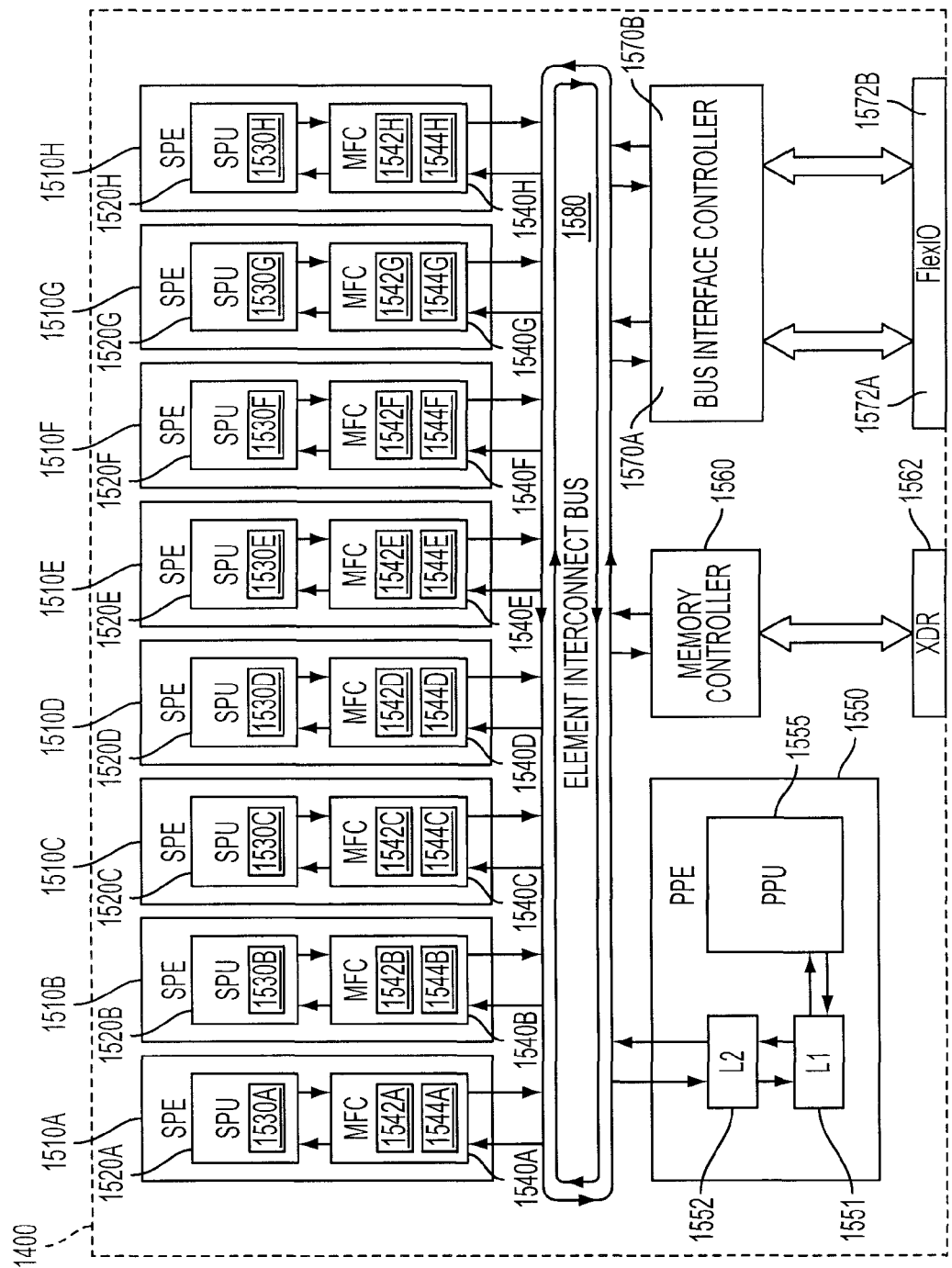
FIG. 9 is a schematic of the Cell processor in accordance with one embodiment of the present invention.

FIG. 9 is a schematic of the Cell processor 928 in accordance with one embodiment of the present invention. The Cell processors 928 has an architecture comprising four basic components: external input and output structures comprising a memory controller 1060 and a dual bus interface controller 1070A,B; a main processor referred to as the Power Processing Element 1050; eight co-processors referred to as Synergistic Processing Elements (SPEs) 1010A-H; and a circular data bus connecting the above components referred to as the Element Interconnect Bus 1080. The total floating point performance of the Cell processor is 218 GFLOPS, compared with the 6.2 GFLOPs of the Playstation 2 device's Emotion Engine.

The Power Processing Element (PPE) 1050 is based upon a two-way simultaneous multithreading Power 970 compliant PowerPC core (PPU) 1055 running with an internal clock of 3.2 GHz. It comprises a 512 kB level 2 (L2) cache and a 32 kB level 1 (L1) cache. The PPE 1050 is capable of eight single position operations per clock cycle, translating to 25.6 GFLOPs at 3.2 GHz. The primary role of the PPE 1050 is to act as a controller for the Synergistic Processing Elements 1010A-H, which handle most of the computational workload. In operation the PPE 1050 maintains a job queue, scheduling jobs for the Synergistic Processing Elements 1010A-H and monitoring their progress. Consequently each Synergistic Processing Element 1010A-H runs a kernel whose role is to fetch a job, execute it and synchronizes with the PPE 1050.

Each Synergistic Processing Element (SPE) 1010A-H comprises a respective Synergistic Processing Unit (SPU) 1020A-H, and a respective Memory Flow Controller (MFC) 1040A-H comprising in turn a respective Dynamic Memory Access Controller (DMAC) 1042A-H, a respective Memory Management Unit (MMU) 1044A-H and a bus interface (not shown). Each SPU 1020A-H is a RISC processor clocked at 3.2 GHz and comprising 256 kB local RAM 1030A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1020A-H does not directly access the system memory XDRAM 926; the 64-bit addresses formed by the SPU 1020A-H are passed to the MFC 1040A-H which instructs its DMA controller 1042A-H to access memory via the Element Interconnect Bus 1080 and the memory controller 1060.

The Element Interconnect Bus (EIB) 1080 is a logically circular communication bus internal to the Cell processor 928 which connects the above processor elements, namely the PPE 1050, the memory controller 1060, the dual bus interface 1070A,B and the 8 SPEs 1010A-H, totaling 12 participants. Participants can simultaneously read and write to the bus at a rate of 8 bytes per clock cycle. As noted previously, each SPE 1010A-H comprises a DMAC 1042A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 1060 comprises an XDRAM interface 1062, developed by Rambus Incorporated. The memory controller interfaces with the Rambus XDRAM 926 with a theoretical peak bandwidth of 25.6 GB/s.

The dual bus interface 1070A,B comprises a Rambus FlexIO® system interface 1072A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 928 to the Reality Simulator graphics unit 930 will typically comprise display lists, being a sequence of commands to draw vertices, apply textures to polygons, specify lighting conditions, and so on. Embodiments may include capturing depth data to better identify the real-world user and to direct activity of an avatar or scene. The object can be something the person is holding or can also be the person's hand. In the this description, the terms "depth camera" and "three-dimensional camera" refer to any camera that is capable of obtaining distance or depth information as well as two-dimensional pixel information. For example, a depth camera can utilize controlled infrared lighting to obtain distance information. Another exemplary depth camera can be a stereo camera pair, which triangulates distance information using two standard cameras. Similarly, the term "depth sensing device" refers to any type of device that is capable of obtaining distance information as well as two-dimensional pixel information.

Recent advances in three-dimensional imagery have opened the door for increased possibilities in real-time interactive computer animation. In particular, new "depth cameras" provide the ability to capture and map the third-dimension in addition to normal two-dimensional video imagery. With the new depth data, embodiments of the present invention allow the placement of computer-generated objects in various positions within a video scene in real-time, including behind other objects.

Moreover, embodiments of the present invention provide real-time interactive gaming experiences for users. For example, users can interact with various computer-generated objects in real-time. Furthermore, video scenes can be altered in real-time to enhance the user's game experience. For example, computer generated costumes can be inserted over the user's clothing, and computer generated light sources can be utilized to project virtual shadows within a video scene. Hence, using the embodiments of the present invention and a depth camera, users can experience an interactive game environment within their own living room. Similar to normal cameras, a depth camera captures two-dimensional data for a plurality of pixels that comprise the video image. These values are color values for the pixels, generally red, green, and blue (RGB) values for each pixel. In this manner, objects captured by the camera appear as two-dimension objects on a monitor.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An input device for interfacing with a game console to interact with a computer program, comprising:
    a controller having a handle;
    a spherical object connected to a first end of the handle;
        a circuit for identifying position of the handle, the circuit further including communication logic to communicate the identified position to the game console during interaction with the computer program; and
    control input connected to a second end of the handle, wherein the spherical object is placed in contact with a surface when held by the handle, the circuit defined to update the identified position of the handle as the handle is pivoted on the surface, the control input providing commands that are exchanged with the game console to further interact with the computer program; and
    a sensor to detect when the spherical object is in actual contact with the surface, wherein the sensor suspends the identification of position of the controller when the spherical object is not in contact with the surface, the suspension being cancelled when the spherical object is rejoined in contact with the surface; or
    wherein the sensor activates one of a wand or pointer mode when the spherical object is not in contact with the surface.

2. An input device as described in claim 1, wherein the handle is pivoted to enable pitch, roll and yaw control.

3. An input device as described in claim 1, wherein the spherical object is connected to the handle by one of an adjustable switch, a positional switch, a fixed connector, a flexible connector, or a strain gauge.

4. An input device as described in claim 1, wherein the spherical object includes a light element.

5. An input device as described in claim 4, wherein the light element is configured to change colors.

6. An input device as described in claim 1, wherein the handle and spherical object operation in one of a wand mode, a pointer mode, or a joystick mode.

7. An input device for interfacing with a game console to interact with a computer program, comprising:
    a controller having a handle;
    a spherical object connected to a first end of the handle;
    a circuit for identifying position of the handle, the circuit further including communication logic to communicate the identified position to the game console during interaction with the computer program; and
    control input connected to a second end of the handle, wherein the spherical object is placed in contact with a surface when held by the handle, the circuit defined to update the identified position of the handle as the handle is pivoted on the surface, the control input providing commands that are exchanged with the game console to further interact with the computer program;
    wherein the handle includes a joystick installed with an indentation in the handle, the indentation having a slope angled toward the spherical object.

8. An input device as described in claim 7, wherein the handle includes supplemental input, the supplemental input being positioned on the handle between the joystick and the spherical object.

9. An input device as described in claim 8, wherein the supplemental input includes a plurality of buttons, where one of the plurality of buttons is partially within the indentation in the handle.

10. An input device as described in claim 1, wherein the control input connected to the second end of the handle is a trackball, the trackball further configured to act as a button when pressed.

11. An input device for interfacing with a game console to interact with a computer program, comprising:

a controller having a handle with a first input area and a second input area, the first input area being located on a side surface, the second input area being located on a posterior end;

a spherical section being connected to an anterior end of the controller;

a first circuit to detect when the spherical section is in contact with a surface and enable the second input area to receive control input for the computer program; and a second circuit to identify a position of the handle relative to the surface, the second circuit further including communication logic to communicate the identified position and control input to the game console during interaction with the computer program.

12. An input device as recited in claim 11, wherein the first input area and the second input area are configured to receive a modular interface insert.

\* \* \* \* \*